United States Patent
Wu et al.

(10) Patent No.: US 8,896,589 B2
(45) Date of Patent: Nov. 25, 2014

(54) LIQUID CRYSTAL DISPLAY PANEL AND DISPLAY DRIVING METHOD

(71) Applicant: AU Optronics Corporation, Hsin-Chu (TW)

(72) Inventors: Ming-Hung Wu, Hsin-Chu (TW); Cheng-Chiu Pai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 141 days.

(21) Appl. No.: 13/803,499

(22) Filed: Mar. 14, 2013

(65) Prior Publication Data

US 2014/0009457 A1    Jan. 9, 2014

(30) Foreign Application Priority Data

Jul. 5, 2012    (TW) .............................. 101124213 A

(51) Int. Cl.
*G06F 3/038*    (2013.01)
*G02F 1/133*    (2006.01)
*G09G 3/36*    (2006.01)

(52) U.S. Cl.
CPC .......... *G02F 1/13306* (2013.01); *G09G 3/3696* (2013.01); *G09G 3/3614* (2013.01); *G09G 3/3655* (2013.01); *G09G 3/3674* (2013.01); *G09G 2320/0209* (2013.01)
USPC .............. 345/212; 345/204; 345/52; 345/103

(58) Field of Classification Search
None
See application file for complete search history.

(56) References Cited

U.S. PATENT DOCUMENTS 7,567,308 B2 *    7/2009    Furuya ............................ 349/43
2010/0079396 A1 *    4/2010    Sasaki et al. .................. 345/173

FOREIGN PATENT DOCUMENTS

CN    102608818 A    7/2012

* cited by examiner

*Primary Examiner* — Muhammad N Edun
(74) *Attorney, Agent, or Firm* — WPAT, PC; Justin King

(57) ABSTRACT

A liquid crystal display panel and a display driving method are disclosed. The liquid crystal display panel includes several pixel units, several scan lines, several common electrode lines coupled with the pixel units and several common electrode control units. The common electrode control units are configured for controlling the voltage levels of the common electrode lines. Each one of the common electrode control units generates a first output signal and a second output signal opposite to the first output signal according to the former common electrode controlling unit and two adjacent scan lines. The common electrode controlling unit controls a voltage level on one of the common electrode lines according to the first output signal, and outputs the first output signal and the opposite second output signal to the next common electrode control unit.

17 Claims, 20 Drawing Sheets

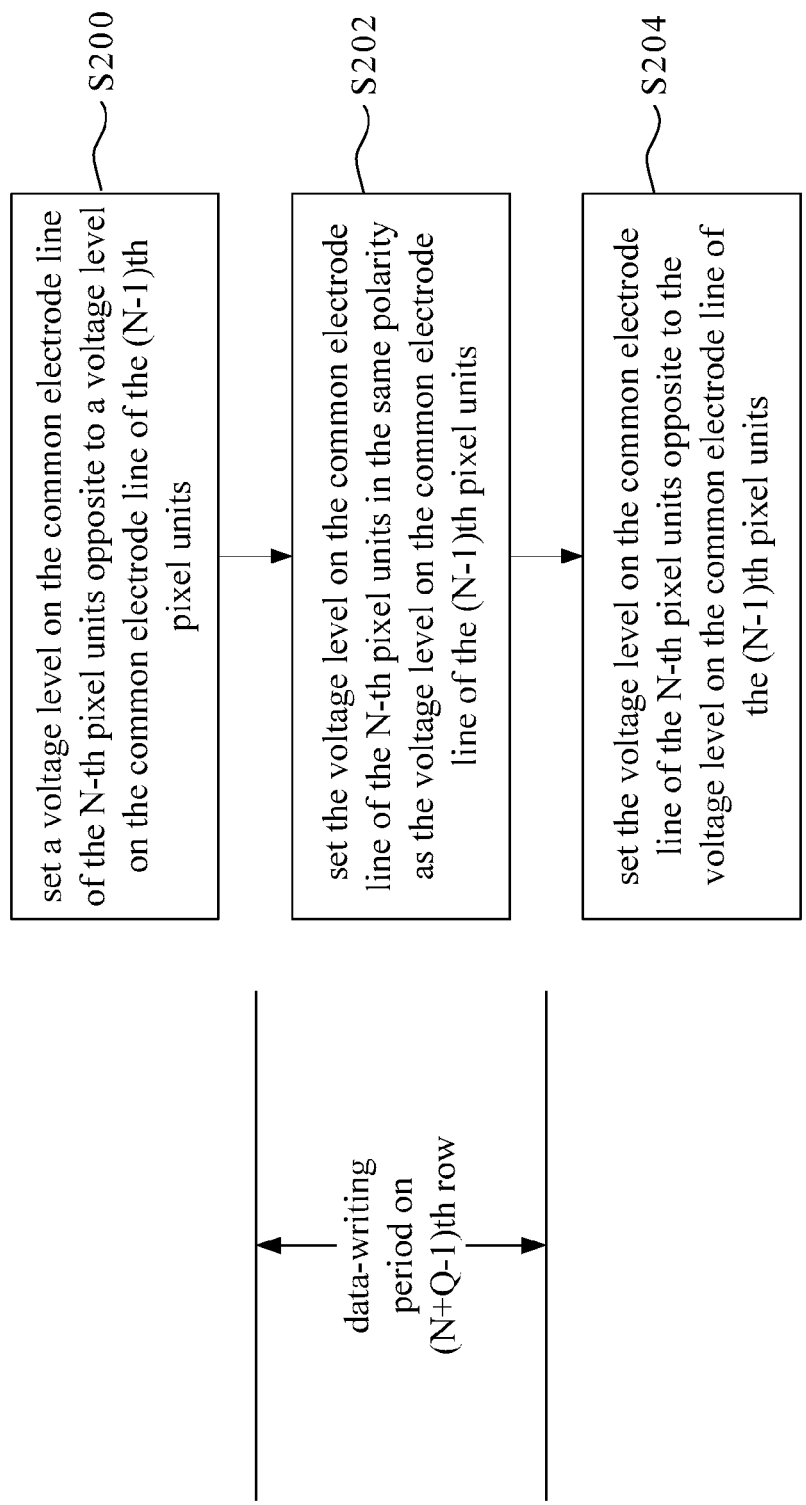

LIQUID CRYSTAL DISPLAY PANEL AND DISPLAY DRIVING METHOD

RELATED APPLICATIONS

This application claims priority to Taiwan Patent Application Serial Number 101124213, filed Jul. 5, 2012, which is herein incorporated by reference.

BACKGROUND

1. Technical Field

The present disclosure relates to a display technology. More particularly, the present disclosure relates to a liquid crystal display (LCD) panel and a display driving method.

2. Description of Related Art

The liquid crystal display (LCD) monitors are the most common digital display device now. Reference is made to FIG. 1, which is a schematic diagram illustrating a traditional LCD panel 100. As shown in FIG. 1, each pixel unit 120 of the traditional LCD panel 100 includes a driving switch 122, a storage $C_{ST}$ and a pixel capacitor $C_{LC}$.

In traditional driving manner, all pixel capacitors $C_{LC}$ are usually coupled to the same common electrode COM, and the common electrode COM provides a fixed direct-current (DC) voltage, and it is known as the DC common voltage driving. In order to achieve the pixel polarity inversion driving (dot inversion, row inversion driving, column inversion or frame inversion, etc) in the case that the common voltage is a DC constant (such as fixed at 0 Volts), the data voltage $V_{DATA}$ provided by the data lines D has to been changed significantly between the positive and negative voltage levels (such as +5 volts to −5 volts), such that the power-consumption is heavy and the slew rate of data charging is slow (i.e., a longer charging time).

Therefore, some other driving manners in prior art are proposed. For example, the row inversion driving method provides the common voltage with alternating polarities (e.g., switched between +5 Volts and 0 Volts) to the common electrode COM, such that the data voltage $V_{DATA}$ on the data line D has to been varied between 0 Volts and +5 Volts only, so as to reduce the charging time. Reference is made to FIG. 2, which is a schematic diagram illustrating a LCD panel 102 with row-inversion driving in prior art. As shown in FIG. 2, the voltage of the common electrode COM is switched between the positive-polarity common voltage VcomH and the negative-polarity common voltage VcomL by switching the conductive states of the first switch T1 and the second switch T2 in each row of pixel units.

The storage capacitors of pixel units on each row are respectively coupled to the common electrode lines COM1, COM2 and COM3. The storage capacitors of the pixel units 120 on the first row of the LCD panel 102 are coupled to the common electrode line COM1. The level of the common electrode line COM1 is decided by the conductive states of the first switch T1 and the second switch T2. The gate electrodes of the first switch T1 and the second switch T2 are controlled by adjacent scan lines G1 and G2.

SUMMARY

There is an issue of floating level existed on the common electrode line COM1 within the traditional LCD panel 102 as shown in FIG. 2. In respect to the common electrode line COM1 corresponding to the pixel units on the first row, the first switch T1 and the second switch T2 are turned off when the scan line G1 and the scan line G2 are not enabled, such that the voltage level on the common electrode line COM1 is floating outside of the enabling periods of the scan lines G1 and G2. For example, after the enabling period of the scan line G2 in the current frame is finished, the voltage level on the common electrode line COM1 remains floating until the scan line G1 is enabled in the next frame.

When the voltage level on the common electrode line COM1 is floating, the voltage level on the common electrode line COM1 is vulnerable to signal interference from pixel units on some other rows. Similarly, the issue of floating level also existed on other common electrode lines (e.g., COM2 and COM3). For example, there may be an intrinsic capacitor Ci existed between the data line and the common electrode line corresponding to each pixel unit. Therefore, the pixel unit on one row may encounter the interference from another pixel unit on other rows (e.g., the data signal transmitting on the second row may cause interference to the common electrode line COM1 on the first row). Therefore, a display driving structure capable of providing row-inversion driving signals and free from the issue of floating level is required.

To solve the problems in the art, embodiments of the invention provides a liquid crystal display (LCD) panel and a display driving method. The LCD panel in this disclosure includes a simple-constructed common electrode control unit. In order to prevent pixel unit on one row from being disturbed by pixel units on other rows during the non-active period, the common electrode control unit can reduce the duration in which the common electrode lines are floating, or the common electrode control unit can prevent the common electrode line from floating.

An aspect of the disclosure is to provide a LCD panel, which include a plurality of data lines on a plurality of columns, a plurality of scan lines on a plurality of rows, a plurality of pixel units on the rows, a first and a second common electrode lines and a first and a second common electrode control units. Each of the rows has a plural of pixel units. Each of the pixel units is electrically coupled to a corresponding data line and a corresponding scan line. The pixel units on the same row are electrically coupled to the same scan line. Each of the pixel units includes a storage capacitor. The first and the second common electrode lines are coupled to ends of the storage capacitors within the pixel units on two rows from the rows respectively.

According to an embodiment of the invention, the first and the second common electrode control units are coupled to the pixel units on these two rows via the first and the second common electrode lines, for generating a first output signal and an second output signal opposite to the first output signal and controlling voltage levels on the first and the second common electrode lines. Each of the first and the second common electrode control units includes a selection unit and an output unit. The output units of the first and the second common electrode control unit are electrically coupled to the first and the second common electrode lines respectively. The selection unit of the first common electrode control unit is configured to receive a first input signal and a second input signal opposite to the first input signal, and selectively outputs the first input signal or the second input signal. The output unit of the first common electrode control unit, electrically coupled to the selection unit of the first electrode control unit, is configured to output the first output signal and the second output signal of the first common electrode control unit. The selection unit of the second common electrode control unit is configured to receive the first output signal from the first common electrode control unit and the second output signal from the first common electrode control unit, and selectively outputs the first output signal from the first common electrode control unit or the second output signal from the first common electrode control unit. The output unit of the second common electrode control unit, electrically coupled to the selection unit of the second electrode control unit, is configured to output the first output signal and the second output signal of the second common electrode control unit.

Another aspect of the disclosure is to provide a display driving method suitable for driving a liquid crystal display panel. The liquid crystal display panel includes a plurality of data lines on a plurality of columns, a plurality of scan lines on a plurality of rows, a plurality of common electrode lines and a plurality of pixel units on the rows. Each of the rows has a plural of pixel units. Each of the pixel units is electrically coupled to a corresponding data line and a corresponding scan line. The pixel units on the same row are electrically coupled to the same scan line. Each of the pixel units includes a storage capacitor. The capacitors of the pixel units on each row are electrically coupled one corresponding common electrode line.

According to an embodiment of the disclosure, the display driving method include steps of: before a data-writing period to the pixel units on the (N−K−1)th row, setting a voltage level on the common electrode line of the N-th pixel units opposite to a voltage level on the common electrode line of the (N−1)th pixel units, wherein N is a positive integer larger than 1; during the data-writing period to the pixel units on the (N−K−1)th row, setting the voltage level on the common electrode line of the N-th pixel units in the same polarity as the voltage level on the common electrode line of the (N−1)th pixel units; and, after the data-writing period to the pixel units on the (N−K−1)th row, setting the voltage level on the common electrode line of the N-th pixel units opposite to the voltage level on the common electrode line of the (N−1)th pixel units, wherein K is zero or a positive integer less than (N−2).

According to another embodiment of the disclosure, the display driving method include steps of: before a data-writing period to the pixel units on the (N+Q−1)th row, setting a voltage level on the common electrode line of the N-th pixel units opposite to a voltage level on the common electrode line of the (N−1)th pixel units, wherein N is a positive integer larger than 1; during the data-writing period to the pixel units on the (N+Q−1)th row, setting the voltage level on the common electrode line of the N-th pixel units in the same polarity as the voltage level on the common electrode line of the (N−1)th pixel units; and, after the data-writing period to the pixel units on the (N+Q−1)th row, setting the voltage level on the common electrode line of the N-th pixel units opposite to the voltage level on the common electrode line of the (N−1)th pixel units, wherein Q is zero or a positive integer larger than zero and less than (R−N+1), and R is the amount of rows It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference to the accompanying drawings as follows:

FIG. 22, which is a flow chart illustrating a display driving method according to an embodiment of the invention.

DESCRIPTION OF THE EMBODIMENTS

In the following description, several specific details are presented to provide a thorough understanding of the embodiments of the present disclosure. One skilled in the relevant art will recognize, however, that the present disclosure can be practiced without one or more of the specific details, or in combination with or with other components, etc. In other instances, well-known implementations or operations are not shown or described in detail to avoid obscuring aspects of various embodiments of the present disclosure.

Figure 1:
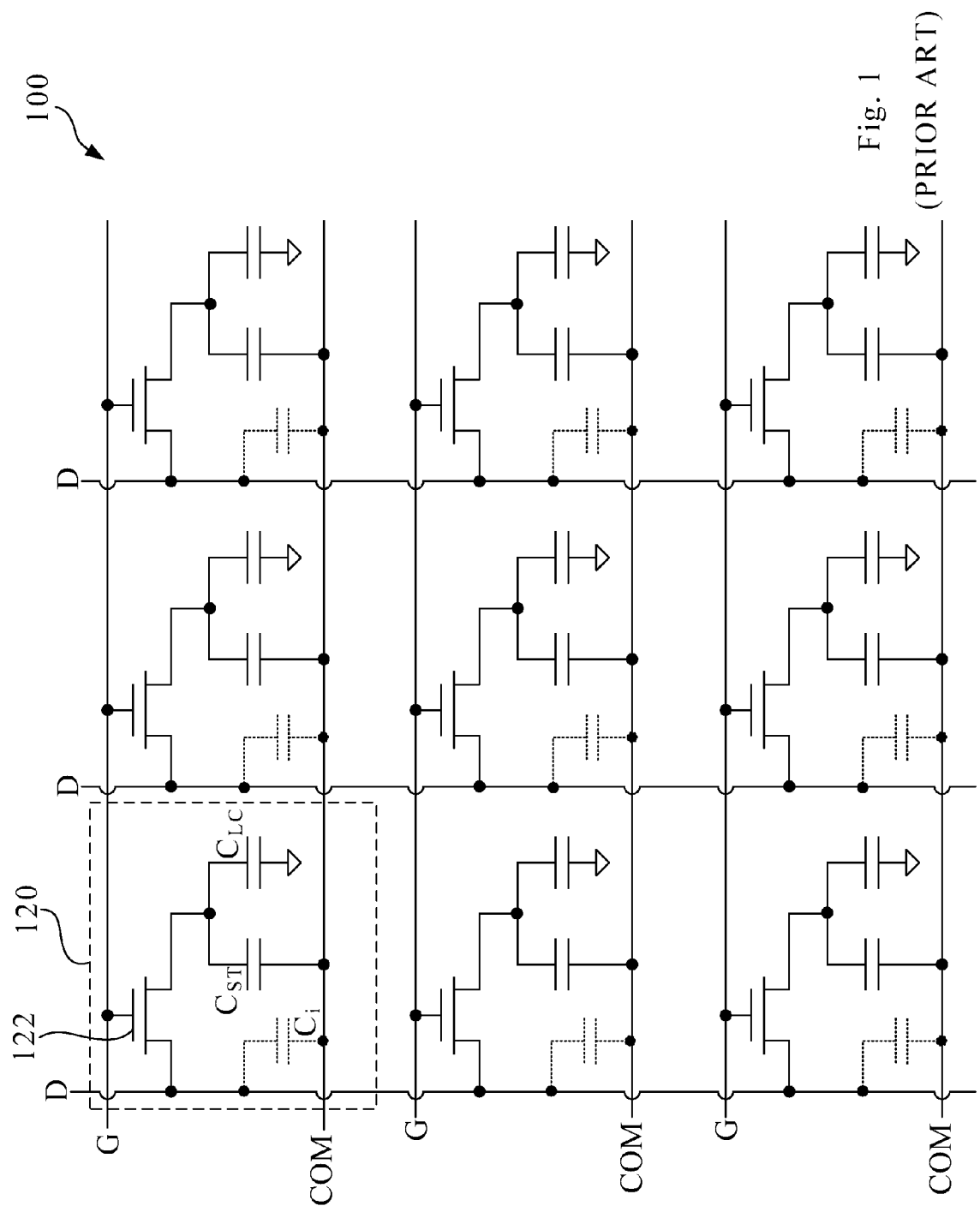
FIG. 1 is a schematic diagram illustrating a traditional LCD panel.
Figure 2:
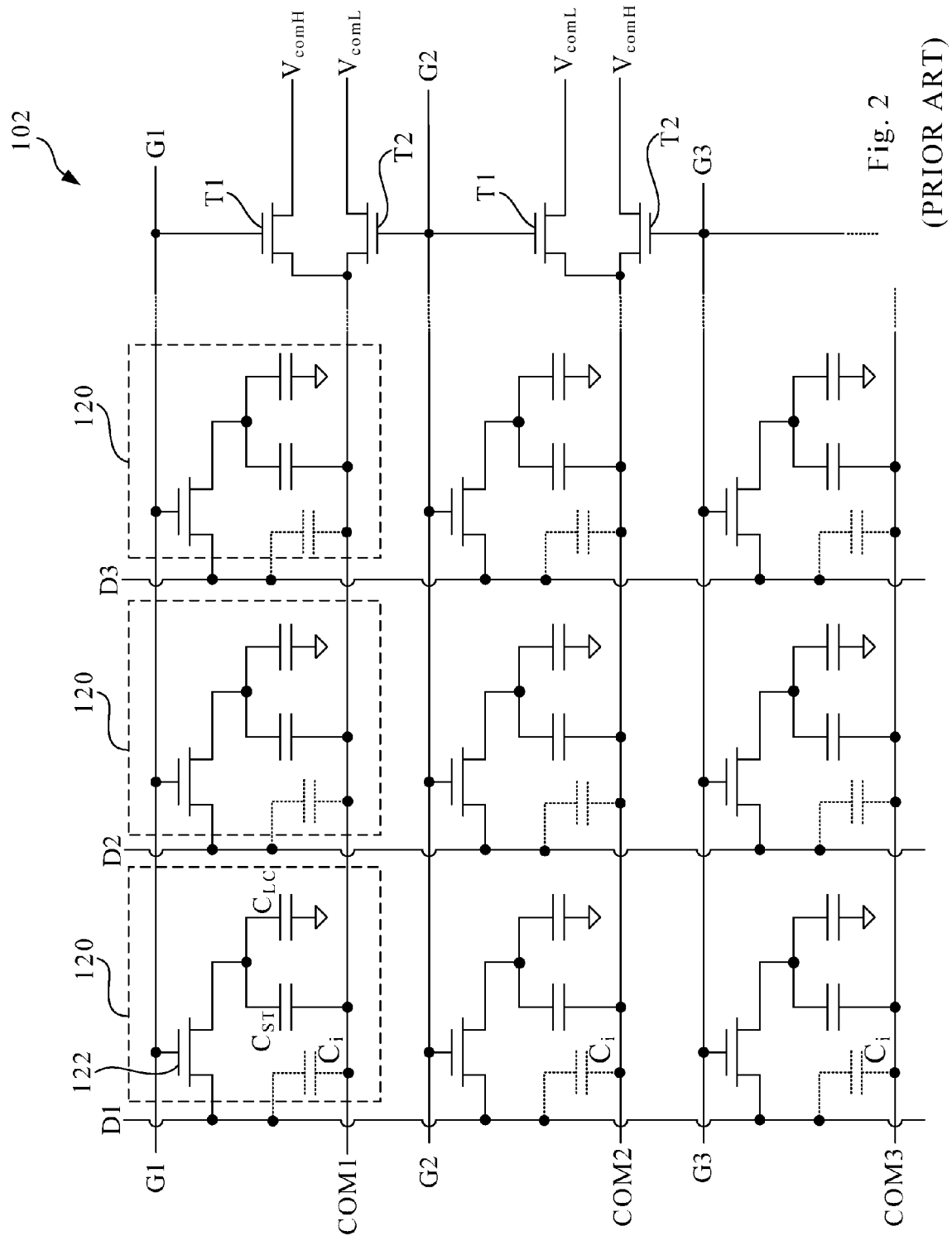
FIG. 2 is a schematic diagram illustrating a LCD panel with row-inversion driving in prior art.
Figure 3:
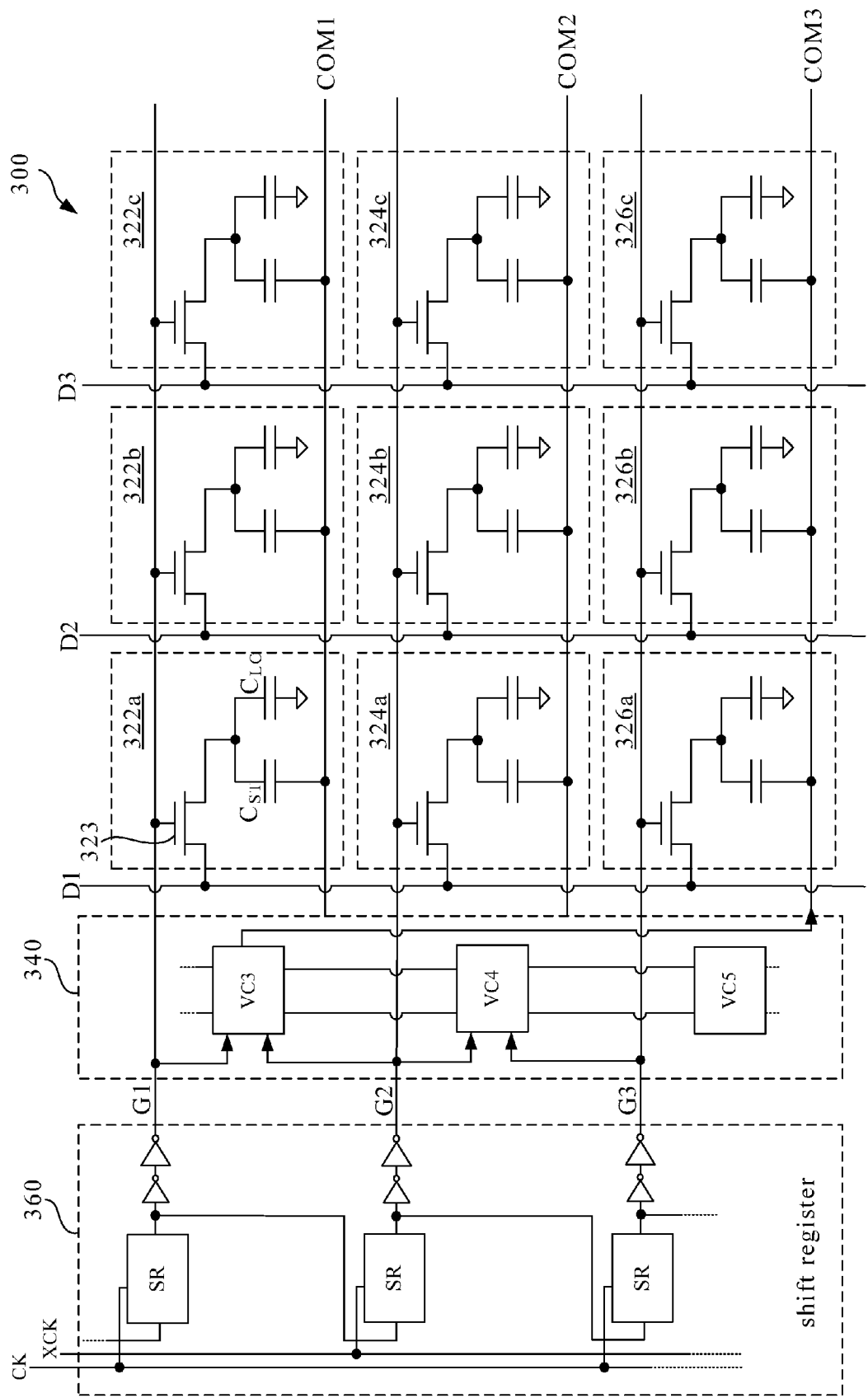
FIG. 3 is a schematic diagram illustrating a liquid crystal display (LCD) panel according to an embodiment of the invention.

Reference is made to FIG. 3, which is a schematic diagram illustrating a liquid crystal display (LCD) panel 300 according to an embodiment of the invention. As shown in FIG. 3, the LCD panel 300 includes plural data lines (D1, D2, D3) on plural columns, plural scan lines (S1, S2, S3) on plural rows, plural common electrode lines (COM1, COM2, COM3), plural pixel units (322a, 322b, 322c, 324a, 324b, 324c, 326a, 326b, 326c) and a common electrode control module 340. For convenience of illustration, the embodiment shown in FIG. 3 only shows 3*3 pixel units for demonstration, but the invention is not limited thereto.

As shown in FIG. 3, the LCD panel 300 includes pixel units on different rows. There are plural pixel units on each row. The pixel units on the same row are electrically coupled to the same scan line. As shown in FIG. 3, there are pixel units 322a, 322b and 322c on one row, and the pixel units 322a, 322b and 322c are all coupled to the scan line G1. In addition, there are pixel units 324a, 324b and 324c on another row, and the pixel units 324a, 324b and 324c are all coupled to the scan line G2, and so on.

Each of the pixel units 322a, 322b, 322c, 324a, 324b, 324c, 326a, 326b and 326c is electrically connected a corresponding data line and a corresponding scan line. For example, the pixel unit 322a corresponds to the data line D1 and the scan line G1, and the pixel unit 324c corresponds to the data line D3 and the scan line G2, and so on.

As shown in FIG. 3, each pixel unit includes a driving switch, a storage capacitor and a pixel capacitor. For example, there are a driving switch 323, a storage capacitor $C_{ST}$ and a pixel capacitor $C_{CL}$ with in the pixel unit 322a.

The pixel units on one of the rows are electrically connected one corresponding data line and one corresponding common electrode line. For example, the control terminals on the driving switches of the pixel units 322a, 322b and 322c on the first row in FIG. 3 are all coupled to the scan line G1, and the storage capacitors $C_{ST}$ of the pixel units 322a, 322b and 322b are all coupled to one corresponding common electrode line COM1.

The control terminals on the driving switches of the pixel units 324a, 324b and 324c on the second row in FIG. 3 are all coupled to the scan line G2, and the storage capacitors $C_{ST}$ of the pixel units 324a, 324b and 324c are all coupled to one corresponding common electrode line COM2.

In addition, the LCD panel 300 in the embodiment includes the common electrode control module 340. The common electrode control module 340 includes plural common electrode control units (e.g., the common electrode control units VC3 and VC4 shown in FIG. 3). The common electrode control units are configured for generating the common electrode voltage for the common electrode lines COM1, COM2 and COM3 according to the scanning signals on the scan lines. For example, the common electrode control unit VC3, which corresponds to the pixel units 326a, 326b and 326c on the third row, generates the common electrode voltage on the common electrode line COM3 according to the scanning signals on the scan lines G1 and G2.

In practical applications, the LCD panel 300 may include pixel units with different columns/rows, corresponding scan lines, scan lines and common electrode lines. The person in the art may infer from this embodiment, and the invention is not limited to the matrix of 3*3 pixel units shown in FIG. 3.

Figure 4:
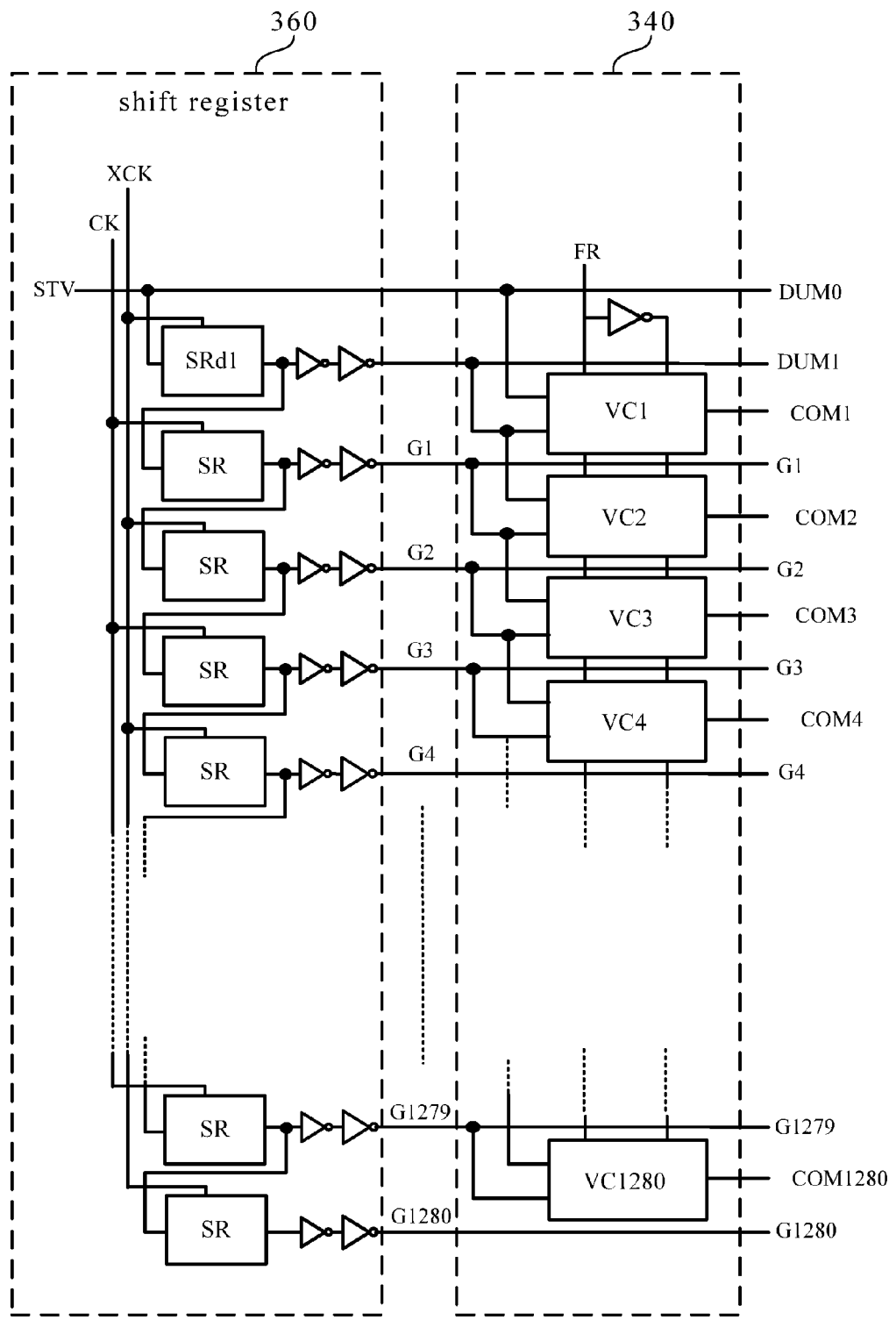
FIG. 4 is a schematic diagram illustrating a shift register, the common electrode control module and the common electrode control units thereof according to the embodiment shown in FIG. 3.

Reference is made to FIG. 4, which is a schematic diagram illustrating a shift register 360, the common electrode control module 340 and the common electrode control units VC1~VC1280 thereof according to the embodiment shown in FIG. 3.

As shown in FIG. 4, the common electrode control module 340 includes plural common electrode control module VC1~VC1280 for providing the common electrode voltages to the common electrode lines COM1~COM1280, and the common electrode voltages are provided to corresponding pixels via the common electrode lines COM1~COM1280. The LCD panel 300 includes a shift register 360. In the embodiment, the shift register may function as a gate driver circuit in this LCD panel 300, for providing the scanning signals required by the LCD panel 300.

In this embodiment, the shift register 360 includes plural stages of shift register units SR. The shift register units SR are configured for providing a sequential scanning signals to the scan lines G1~G1280 in order to control the refreshing operation on the pixel units. In general, the pixel units are refreshed when the scanning signals are enabled (e.g., at a high level). The number of the common electrode control units VC1~VC1280 of the LCD panel 300 in the embodiment is demonstrated as to be 1280 based on a vertical resolution of 1280, but the invention is not limited thereto.

Among the plural shift register units SR, the first shift register unit at the beginning is a dummy shift register unit SRd1, which is electrically coupled to subsequent shift register units SR. The dummy shift register unit SRd1 functions as an initialization circuit before other shift register units SR for generating a dummy scanning signal DUM1. The dummy scanning signal DUM1 does not drive any scan line, but used for triggering the subsequent shift register units SR to provide the sequential scanning signals.

Figure 5:
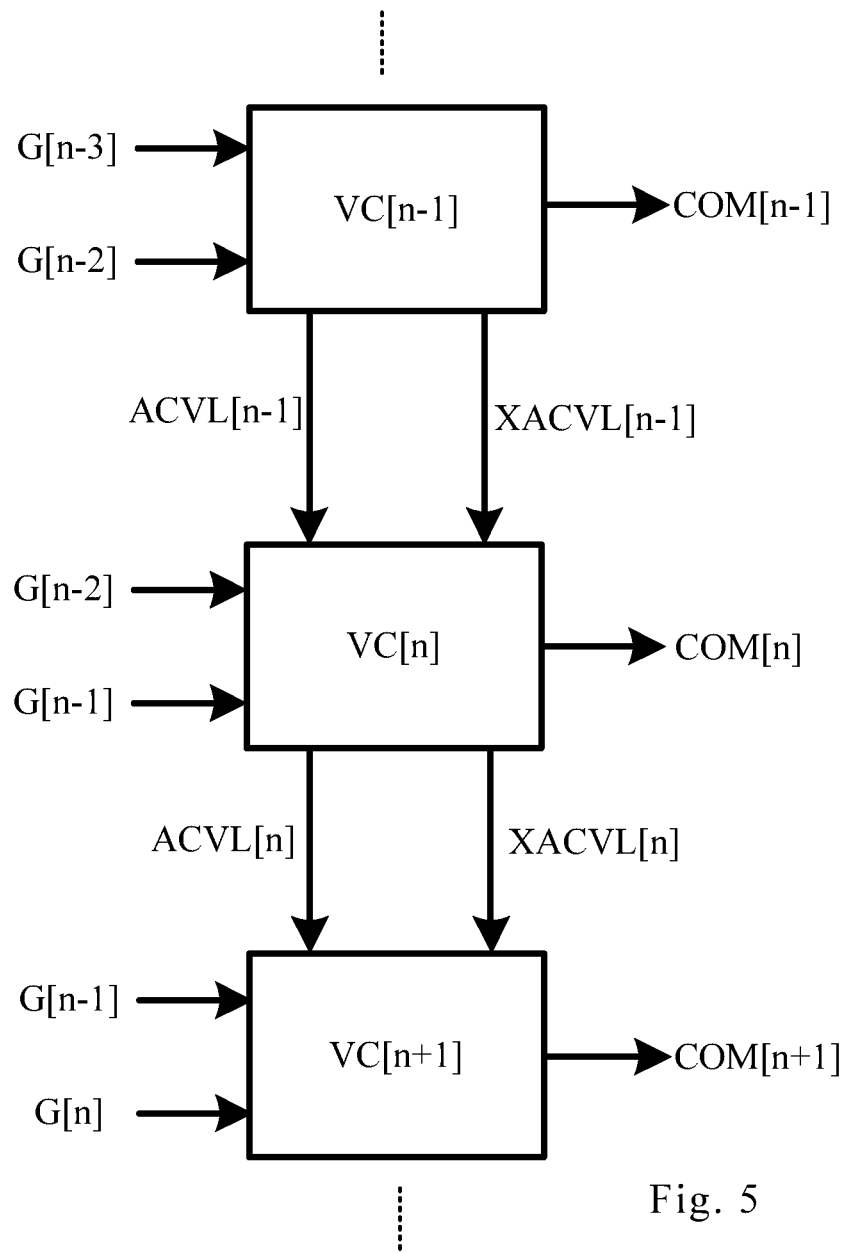
FIG. 5 is a functional block diagram illustrating one common electrode control unit according to the embodiment in FIG. 3 and FIG. 4.

Afterward, reference is made to FIG. 5, which is a functional block diagram illustrating one common electrode control unit VC[n] according to the embodiment in FIG. 3 and FIG. 4.

The common electrode control unit VC[n] represents one of aforesaid common electrode control units VC1~VC1280. For example, n can be a positive integer between 1 and 1280. Besides, the range of n may correspond to the vertical resolution of the LCD panel 300, and is not limited to 1280.

As the embodiment shown in FIG. 5, the common electrode control unit VC[n] includes four input terminals for receiving the scanning signal on the scan line G[n−2] from the second previous stage, the scanning signal on the scan line G[n−1] from the first previous stage, a first input signal ACVL[n−1] and a second input signal XACVL[n−1]. The first input signal ACVL[n−1] and the second input signal XACVL[n−1] are opposite.

The first input signal ACVL[n−1] of the common electrode control unit VC[n] is the first output signal of the common electrode control unit VC[n−1] from the first previous stage. The second input signal XACVL[n−1] of the common electrode control unit VC[n] is the second output signal of the common electrode control unit VC[n−1] from the first previous stage. There are three output terminals on the common electrode control unit VC[n], and three of them are configured to output the common electrode voltage, the first output signal ACVL[n] and the second output signal XACVL[n] on the common electrode control unit VC[n] respectively.

The first output signal ACVL[n] and the second output signal XACVL[n] have opposite signals. The first output signal ACVL[n] and the second output signal XACVL[n] are connected the input terminals the common electrode control unit VC[n+1] on the next stage.

As the example of the common electrode control unit VC4 shown in FIG. 3 and FIG. 4, the input terminals on the common electrode control unit VC4 are connected to the scan line G2 on the second previous stage, the scan line G3 on the first previous stage, the first input signal ACVL3 (from the common electrode control unit VC3) and second input signal XACVL3 ((from the common electrode control unit VC3). The output terminals on the common electrode control unit VC4 are connected to the common electrode voltage on the common electrode line COM4, the first output signal ACVL4

(toward the common electrode control unit VC5) and the second output signal XACVL4 (toward the common electrode control unit VC5).

In addition, the VC[n] shown in FIG. 5 represents the example when n is a positive integer larger than 2 (i.e., n is no less than 3). When n is equal to 1, the common electrode control unit VC1 on the first row does not has the scan lines on the second previous stage and the first previous stage, and therefore, two corresponding input terminals on the common electrode control unit VC1 are coupled to the dummy scanning signals DUM0 and DUM1. On the other hand, when n is equal to 2, the common electrode control unit VC2 on the second row does not has the scan line on the second previous stage, and therefore, the corresponding input terminals on the common electrode control unit VC2 is coupled to the dummy scanning signal DUM1.

Figure 6:
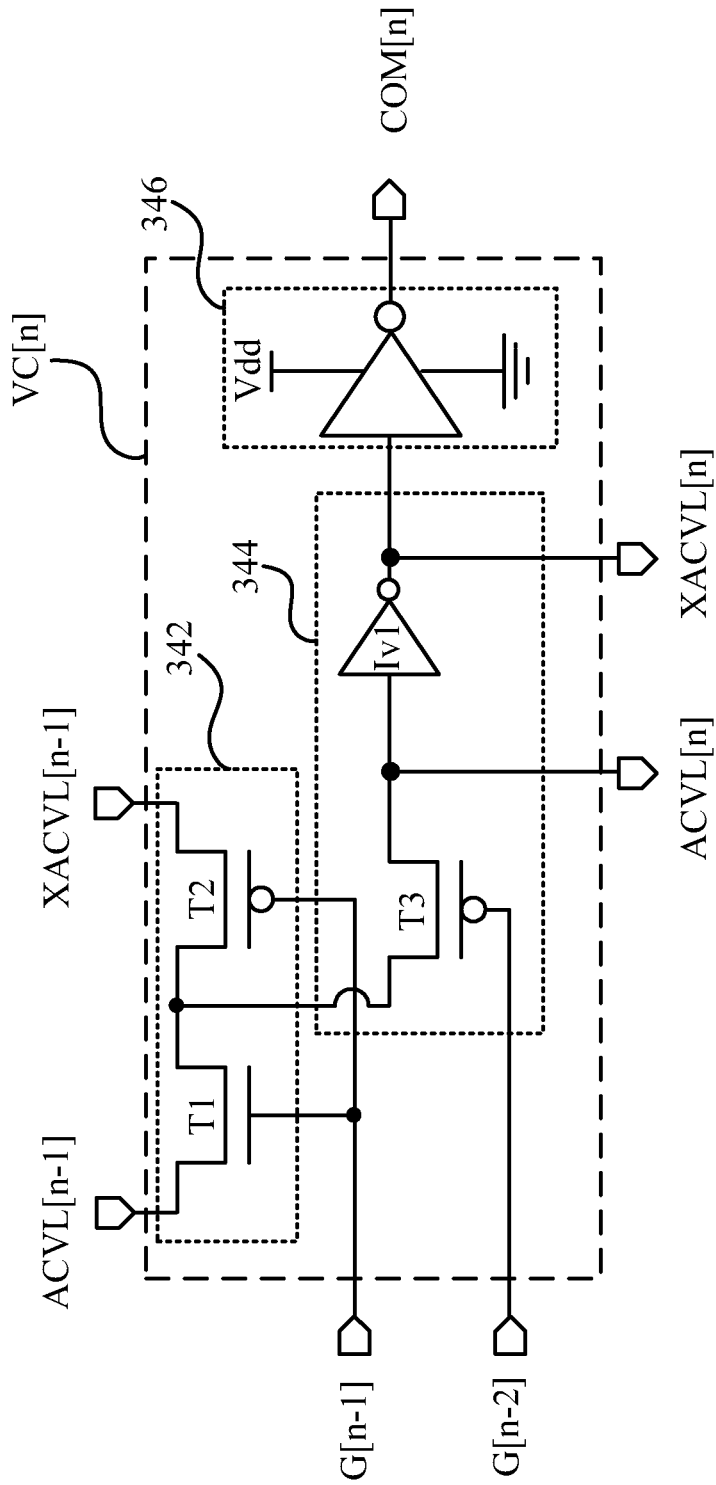
FIG. 6 is a schematic diagram illustrating the circuit of the common electrode control unit in the embodiment shown in FIG. 5.

Reference is made to FIG. 6, which is a schematic diagram illustrating the circuit of the common electrode control unit VC[n] in the embodiment shown in FIG. 5. As shown in FIG. 6, each common electrode control unit VC[n] includes a selection unit 342 and an output unit 344. Each output unit 344 is electrically coupled to the corresponding common electrode line COM[n] (as shown in FIG. 3 to FIG. 5).

The selection unit 342 of the common electrode control unit VC[n] is configured to receive the input signal ACVL[n−1] (i.e., the output signal ACVL[n−1] form the common electrode control unit VC[n−1] on the first previous stage) and the input signal XACVL[n−1] (i.e., the output signal XACVL[n−1] form the common electrode control unit VC[n−1] on the first previous stage) opposite to the input signal ACVL[n−1]. The selection unit 342 of the common electrode control unit VC[n] selectively outputs the first input signal ACVL[n−1] or the second input signal XACVL[n−1] to the output unit 344. In other words, the selection unit 342 of the common electrode control unit VC[n] selectively outputs a signal in phase with the first input signal ACVL[n−1] or the second input signal XACVL[n−1] to the output unit 344 of the common electrode control unit VC[n]. The output unit 344 of the common electrode control unit VC[n] is electrically coupled to the selection unit 342 of the common electrode control unit VC[n]. The output unit 344 is configured to output an output signal ACVL[n] and an opposite output signal XACVL[n] of the common electrode control unit VC[n].

In the embodiment shown in FIG. 6, each selection unit 342 includes a first switch T1 and a second switch T2. Conductive states on the first switch and the second switch is mutually-exclusive. An input terminal on the first switch T1 of the common electrode control unit VC[n] is configured for receiving the input signal ACVL [n−1] (i.e., the output signal ACVL[n−1] form the common electrode control unit VC[n−1] on the first previous stage). The input terminal on the second switch T2 of the common electrode control unit VC[n] is configured for receiving the input signal XACVL[n−1] (i.e., the output signal XACVL[n−1] form the common electrode control unit VC[n−1] on the first previous stage). The first switch T1 and the second switch T2 can a N-type transistor and a P-type transistor respectively.

In addition, aforesaid coupling relationship is demonstrated under n>1 (i.e., n is no less than 2). The common electrode control unit VC1 does not have any common electrode control unit on the first previous stage. Therefore, the first switch T1 and the second switch T2 of the common electrode control unit VC1 can be coupled to an enabling signal FR and an opposite signal thereof (as shown in FIG. 4). In this embodiment, control terminals on the first switch T1 and the second switch T2 of the common electrode control unit VC[n] are electrically coupled to the scan line G[n−1].

Each output unit 344 of the common electrode control unit VC[n] includes a third switch T3 and a first inverter Iv1. Each third switch T3 has an input terminal, an output terminal and a control terminal. Each first inverter Iv1 has an input terminal and an output terminal.

The input terminal on the third switch T3 of the common electrode control unit VC[n] is electrically coupled to the output terminals on the first switch T1 and the second switch T2 of the common electrode control unit VC[n]. The control terminal on the third switch T3 of the common electrode control unit VC[n] is electrically coupled to the scan line G[n−2].

The first inverter Iv1 of the common electrode control unit VC[n] is configured for generating the output signal ACVL [n] and the opposite output signal XACVL[n], which are provided to the common electrode control unit VC[n+1] on the next stage.

Within the common electrode control unit VC[n], the input terminal on the first inverter Iv1 is electrically coupled to the output terminal on the third switch T3, and the input terminal on the first inverter Iv1 provides the output signal ACVL[n] (function as the input signal ACVL[n] to the common electrode control unit VC[n+1] on the next stage). The output terminal on the first inverter In1 is electrically coupled to the common electrode line COM[n]. The output terminal on the first inverter Iv1 provides the output signal XACVL[n] (function as the input signal XACVL[n] to the common electrode control unit VC[n+1] on the next stage).

Each common electrode control unit VC[n] further comprises a level-adjustment circuit 346, which is electrically coupled between the output terminal of the third switch T3 of the common electrode control unit VC[n] and the common electrode line COM[n] electrically coupled with the common electrode control unit VC[n]. The level-adjustment circuit 346 is configured for shifting a voltage range of the output signal ACVL[n] of the common electrode control unit VC[n], so as to generate the common electrode voltage on the common electrode line COM[n].

For example, the voltage range within the common electrode control unit VC[n] can be +10V to −8V, and the level-adjustment circuit 346 may convert the voltage range into +5V to 0V for corresponding to the allowable range of the common electrode voltage.

In addition, because the common electrode control unit VC1 does not has a scan line on the first or the second previous stage. Therefore, the control terminals of the first switch T1 and the second switch T2 of the common electrode control unit VC1 are coupled to the dummy scanning signal DUM1. The third switch T3 is coupled to the dummy scanning signal DUM0 (as shown in FIG. 4, the dummy scanning signal DUM0 can be an enabling signal STV of the dummy shift register unit SRd1, and the time-sequence of the enabling signal STV is one time-unit before the dummy scanning signal DUM1). On the other hand, because the common electrode control unit VC2 does not has a scan line on the second previous stage. Therefore, the third switch T3 of the common electrode control unit VC2 is coupled to the dummy scanning signal DUM1.

Figure 7:
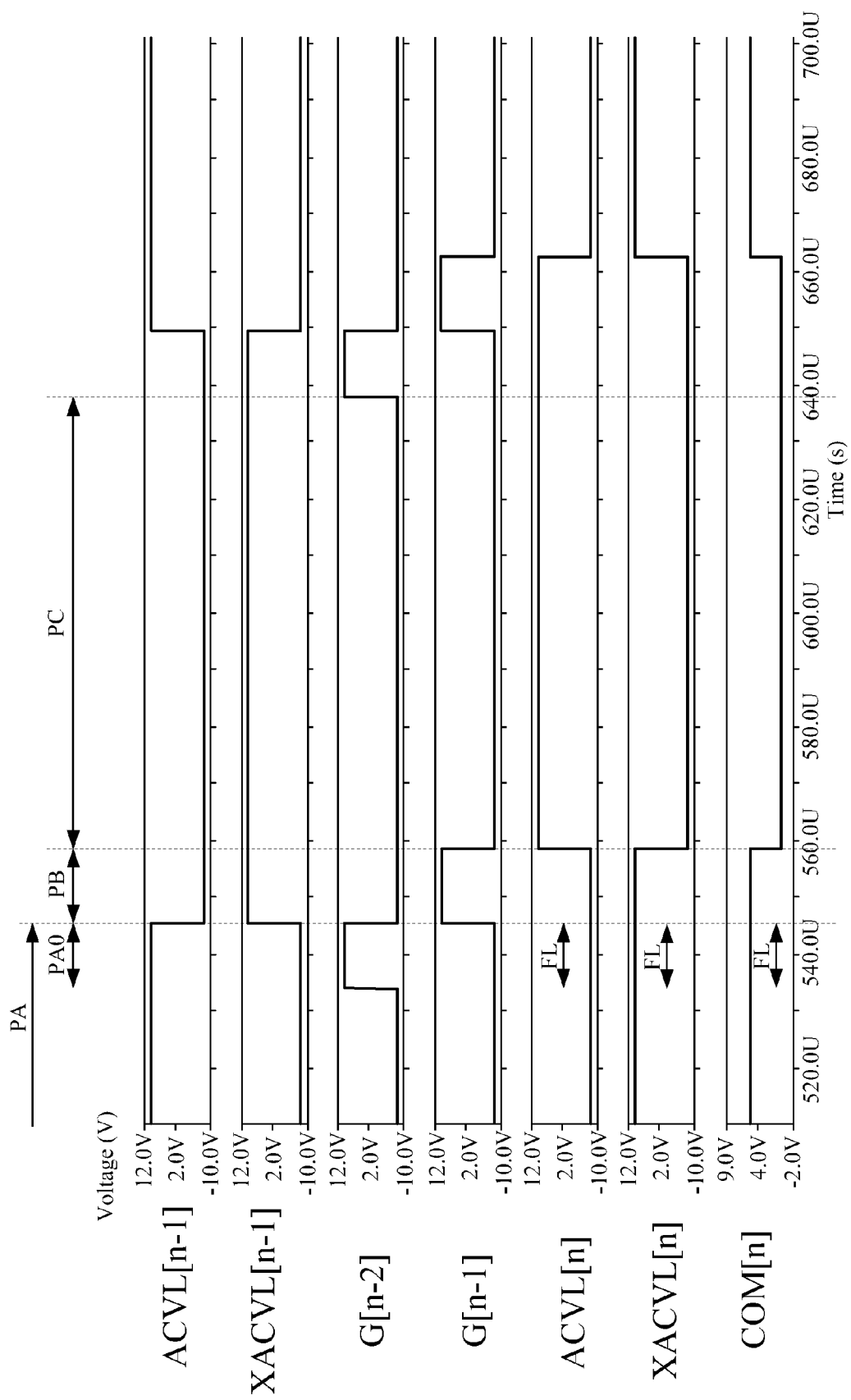
FIG. 7 is a timing diagram illustrating relative signals of the common electrode control unit according to the embodiment shown in FIG. 5.
Figure 8:
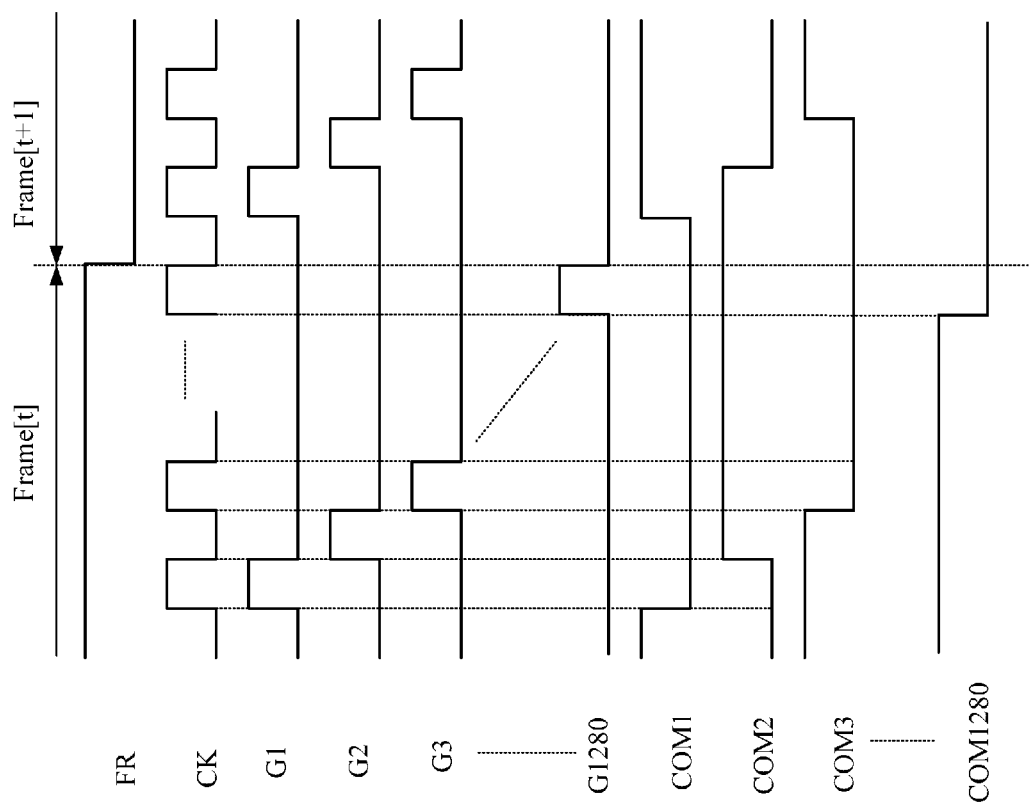
FIG. 8 is a timing diagram illustrating signals of the common electrode control module according to the embodiment shown in FIG. 5.

Reference is also made to FIG. 7 and FIG. 8. FIG. 7 is a timing diagram illustrating relative signals of the common electrode control unit VC[n] according to the embodiment shown in FIG. 5. FIG. 8 is a timing diagram illustrating signals of the common electrode control module 340 according to the embodiment shown in FIG. 5.

As shown in FIG. 6 and FIG. 7, before a data-writing period PB to the pixel units on the (n−1)th row (i.e., before the scan line G[n−1] is switched to the high level) as the period PA shown in FIG. 7, the first switch T1 of the common electrode control unit VC[n] is turned off and the second switch T2 of the common electrode control unit VC[n] is conducted (because the G[n−1] is at low level), and the selection unit 342 of the common electrode control unit VC[n] selects the input signal XACVL[n−1] and transmits it to the output unit 344. The output unit 344 of the common electrode control unit VC[n] make the output signal ACVL[n] follow and in-phase to the input signal XACVL[n−1].

During the data-writing period PB to the pixel units on the (n−1)th row (i.e., when the scan line G[n−1] is switched to the high level), the selection unit 342 of the common electrode control unit VC[n] selects the input signal ACVL[n−1] and transmits it to the output unit 344. The output unit 344 of the common electrode control unit VC[n] make the output signal ACVL[n] follow and in-phase to the input signal ACVL[n−1].

After the data-writing period PB to the pixel units on the (n−1)th row (i.e., when the scan line G[n−1] returns to the low level) as the period PC shown in FIG. 7, the selection unit 342 of the common electrode control unit VC[n] selects the input signal XACVL[n−1] and transmits it to the output unit 344. The output unit 344 of the common electrode control unit VC[n] make the output signal ACVL[n] follow and in-phase to the input signal XACVL[n−1].

The output signal ACVL[n] generated by the output unit 344 of the common electrode control unit VC[n] is configured for determining the voltage level on the common electrode line COM[n]. In this embodiment, the output signal ACVL[n] and the common electrode voltage on the common electrode line COM[n] have opposite polarities due to the level adjusting circuit 346 (such as shown in FIG. 7), but the invention is not is limited thereto. In another embodiment, the output signal ACVL[n] and the common electrode voltage on the common electrode line COM[n] may have the same polarity.

In addition, as the described embodiment shown in FIG. 7, at the beginning of the data-writing period PB to the pixel units on the (n−1)th row (i.e., at the junction of the periods PA and PB), the scan lines G[n−1] and G[n−2] are switched simultaneously. The third switch T3 in the embodiment is disclosed to prevent the transient voltage disturbance or delay on the scan line G[n−1] from malfunctioning the first switch T1 and the second switch T2 (e.g. turning on or turning off the first switch T1 and a second switch T2 simultaneously).

In the embodiment, the input terminal of the third switch T3 is electrically coupled the output terminals on the first switch T1 and the second switch T2 of the common electrode control unit VC[n]. The control terminal on the third switch T3 is electrically coupled to the scan line G[n−2].

Therefore, before the data-writing period to the pixel units on the (n−1)th row is initialized and during a data-writing period to the pixel units on the (n−2)th row (i.e., during the period PA0 shown in FIG. 7), the third switch T3 is turned off by the scan line G[n−2] at the low level, such that the output signal ACVL[n], the output signal XACVL[n] and the voltage level on the common electrode line COM[n] corresponding to the common electrode control unit VC[n] are temporarily set to a floating level FL. However, the floating level is substantially equal to the level before the period PA0 (i.e., before the third switch is turned off).

Therefore, the common electrode control unit VC[n] may sequentially form the complete signal waveforms shown in FIG. 8 for corresponding to each of the common electrode lines COM1~COM1280. The common electrode voltages on the common electrode lines COM1~COM1280 are set to specific voltage levels in most of time (except in the period PA0 of each common electrode line COM[n], the common electrode line is at the floating level FL, as shown in FIG. 7), so as to avoid the common electrode lines COM1~COM1280 being at the floating level for a long time and being disturbed by other electronic signals.

Figure 9:
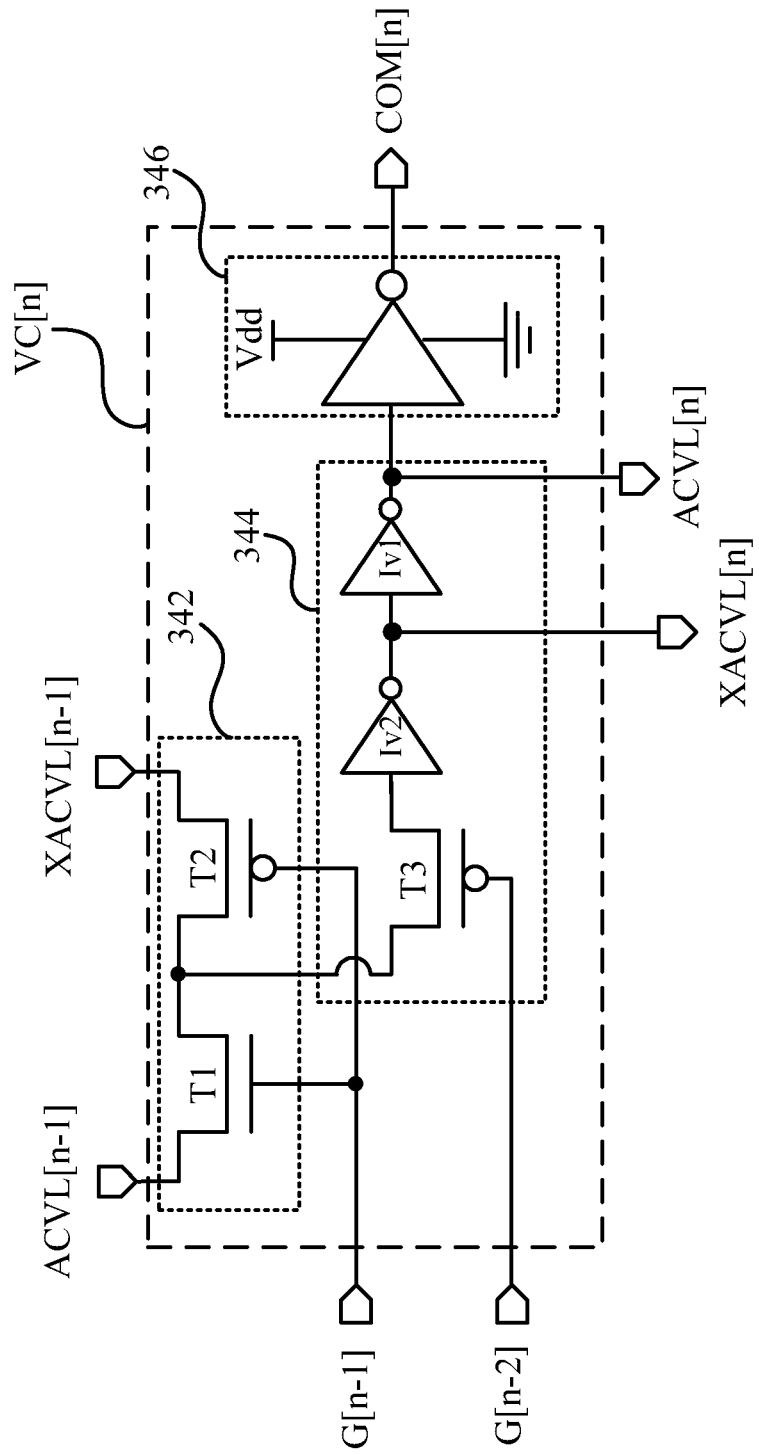
FIG. 9 is a schematic diagram illustrating another circuit structure of the common electrode control unit in FIG. 5 according to another embodiment of the invention.

Reference is made to FIG. 9, which is a schematic diagram illustrating another circuit structure of the common electrode control unit VC[n] in FIG. 5 according to another embodiment of the invention. Compared to FIG. 6, the common electrode control unit VC[n] of the embodiment in FIG. 9 further includes a second inverter Iv2. The second inverter Iv2 is connected in series between the output terminal on the third switch T3 and the first inverter Iv1. A level on a node (as the input terminal on the first inverter Iv1) between the first inverter Iv1 and the second inverter Iv2 is utilized to from the output signal XACVL[n] of the common electrode control unit VC[n]. The output terminal on the first inverter Iv1 is utilized to form another output signal ACVL[n]. The embodiments shown in FIG. 6 and FIG. 9 may achieve similar functions. The second inverter Iv2 is simply utilized to adjust the polarity of signals, and it does not affect the operations of the circuit. The person in the art may understand the operations, so not to be further discussed here.

In addition, the third switch T3 in aforesaid embodiments sets the output signal ACVL[n], the output signal XACVL[n] and the voltage level on the common electrode line COM[n] corresponding to the common electrode control unit VC[n] are temporarily set to a floating level FL, in order to prevent the malfunctioning on the first switch T1 and the second switch T2 caused by the transient disturbance while the scan line G[n−1] is switching. The duration of the floating level FL on the common electrode line COM[n] is short, but it still contains certain risks.

Figure 10:
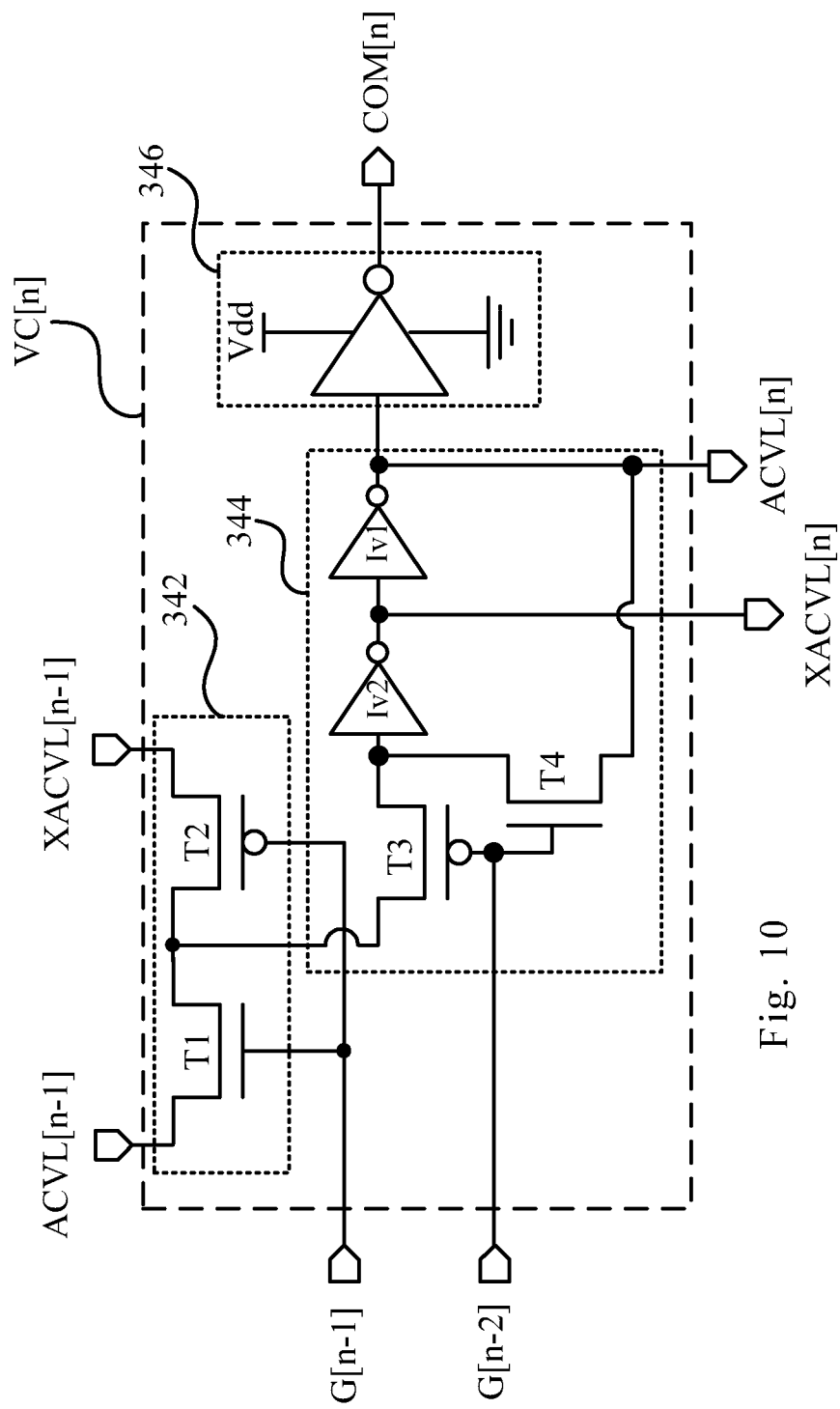
FIG. 10 is a schematic diagram illustrating another circuit structure of the common electrode control unit.
Figure 11:
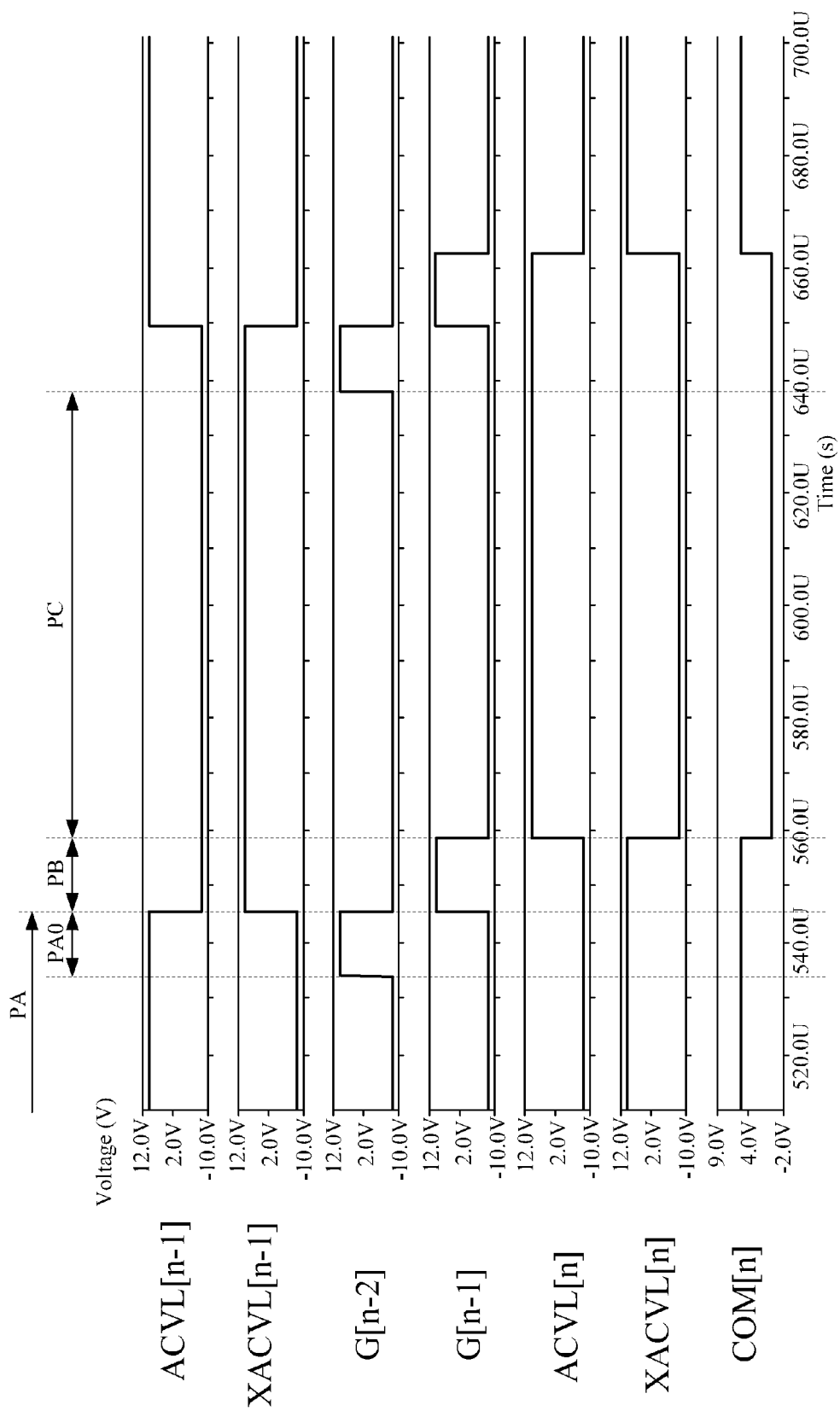
FIG. 11 is a timing diagram illustrating signals relative to the common electrode control unit.

Reference is made to FIG. 10 and FIG. 11. FIG. 10 is a schematic diagram illustrating another circuit structure of the common electrode control unit VC[n]. FIG. 11 is a timing diagram illustrating signals relative to the common electrode control unit VC[n]. Compared to FIG. 6 and FIG. 9, the common electrode control unit VC[n] in FIG. 10 further include a fourth switch T4. The fourth switch T4 has an input terminal, an output terminal and a control terminal. The input terminal of the fourth switch T4 is electrically coupled to the output terminal on the first inverter Iv1 (i.e., the output signal ACVL[n]). The output terminal of the fourth switch T4 is electrically coupled to the input terminal of the second inverter Iv2. The control terminal of the fourth switch T4 and the control terminal of the third switch T3 are electrically coupled to the same scan line (as the scan line G[n−2] in this case). Conductive states of the third switch T3 and the fourth switch T4 are mutually-exclusive.

As shown in FIG. 10 and FIG. 11, before the data-writing period to the pixel units on the (n−1)th row is initialized and during a data-writing period to the pixel units on the (n−2)th row (i.e., during the period PA0 shown in FIG. 10), the third switch T3 is turned off and the fourth switch T4 is turned on at the same time, such that the signal at the output terminal on the first inverter Iv1 is reversely feed back to the input terminal on the second inverter Iv2. Accordingly, the second inverter Iv2, the first inverter Iv1 and the fourth switch T4 form a latch circuit with a feedback loop. Therefore, during the period PA0, the output signal ACVL[n] and the output signal XACVL[n] remains at their current voltage level. The latch circuit with the feedback loop is utilized to avoid the floating level during the period PA0.

In addition, the common electrode control unit VC[n] includes four input terminals for receiving the signal from the scan line G[n−2] on the second previous stage, the signal from the scan line G[n−1] on the first previous stage, the first input signal ACVL[n−1] and the second input signal XACVL[n−

Figure 12:
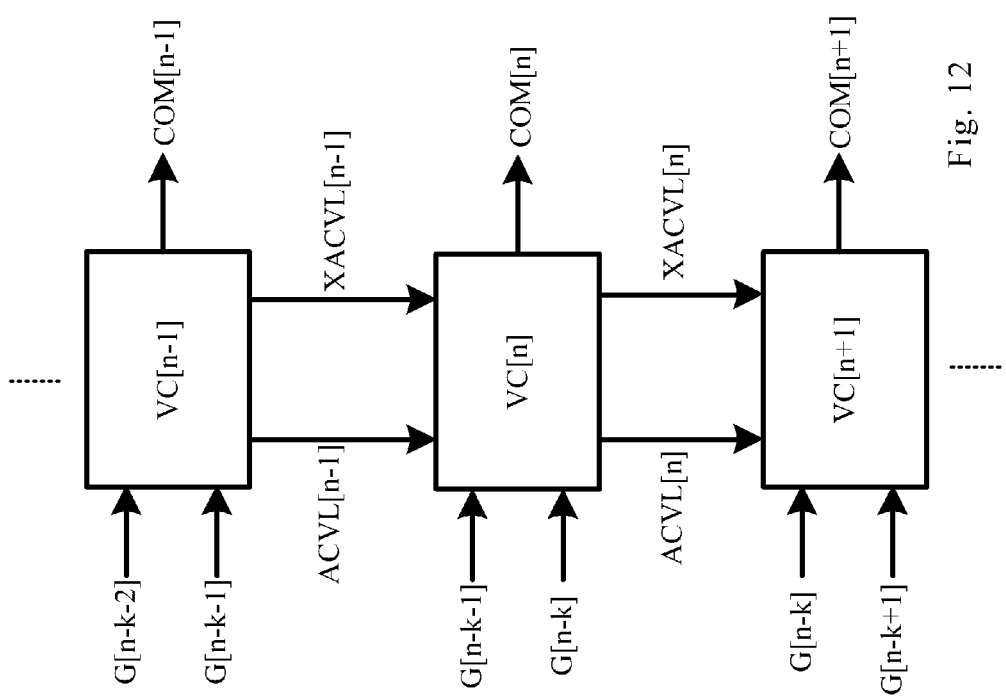
FIG. 12 is a schematic diagram illustrating an external connection relationship of the common electrode control unit.

1]. The first input signal ACVL[n−1] and the second input signal XACVL[n−1] are opposite (as show in FIG. 5). However, the invention is not limited to this way. In some other embodiments, the selection unit 344 (including the switch unit T1 and the switch unit T2) is not limited to be coupled to the scan line G[n−1], and the output unit 346 (including the switch unit T3 and the switch unit T4) is not limited to be coupled to the scan line G[n−2]. Reference is made to FIG. 12, which is a schematic diagram illustrating an external connection relationship of the common electrode control unit VC[n].

FIG. 12 is a schematic diagram illustrating a general model of connection relationship of the common electrode control unit VC[n]. The embodiment in FIG. 3 to FIG. 11 demonstrates one case in which k is equal to 1 according to the general model in FIG. 12, The common electrode control unit VC[n] is coupled to two adjacent rows of scan lines in sequential stages (i.e., the scan line G[n−k] and the scan line G[n−k−1]). In the case, the common electrode control unit VC[n−1] at the former stage is coupled to the scan line G[n−k−1] and the scan line G[n−k−2], and the common electrode control unit VC[n] at the later stage is coupled to the scan line G[n−k+1] and the scan line G[n−k], and so on. In aforesaid general model, k is zero or a positive integer less than (n−2), and n is a positive integer larger than 2. When n-k is a relative small value (i.e., the special case that the common electrode control unit is adjacent to the beginning of gate lines), the common electrode control unit may be coupled to a dummy shift register unit. For example, in respect to the common electrode control unit VC[n−1] in FIG. 12, the sum of (n−k−2) is less than one, such that the control terminal of the third switch of the common electrode control unit VC[n−1] is electrically coupled to a dummy shift register (originally it shall be coupled to G[n−k−2] which is not existed) and receives a first dummy scanning signal.

Referring to FIG. 4 of aforesaid embodiment (in which demonstrates the case of k=1), the common electrode control unit VC has no scan line at the previous stage and the second previous stage, such that the control terminals on the first switch T1 and the second switch T2 of the common electrode control unit VC1 are coupled to the dummy scanning signal DUM1, and the control terminal on the third switch T3 of the common electrode control unit VC1 is coupled to the dummy scanning signal DUM0. On the other hand, because the common electrode control unit VC2 does not has the scan line on the second previous stage, the control terminal on the third switch T3 of the common electrode control unit VC2 is coupled to the dummy scanning signal DUM1.

As shown in FIG. 12, in respect to the common electrode control unit VC[n] corresponding to pixels units on the n-th row, the control terminals on the first switch T1 and the second switch T2 are electrically coupled to the scan line G[n−k] corresponding to the pixel units on the (n−k)th row. At the same time, the control terminal(s) on the third switch T3 (or further including the fourth switch T4) is electrically coupled to the scan line G[n−k−1] corresponding to the pixel units on the (n−k−1)th row.

The value of k does not affect the main function of the invention, only affect the switching-over timing of the common electrode line COM[n] corresponding to the common electrode control unit VC[n]. When the value of k is larger, the switching-over timing of the common electrode line COM[n] is more advance.

Figure 13:
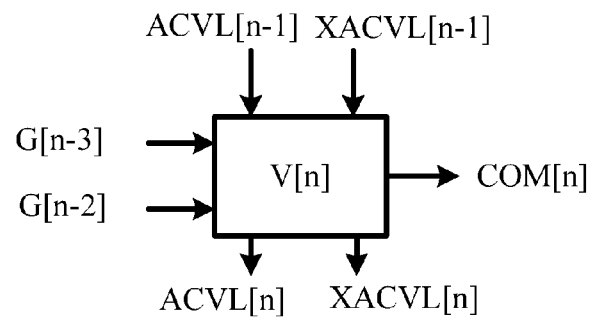
FIG. 13 illustrates the common electrode control unit according to the general model in FIG. 12 when k is equal to 2.
Figure 14:
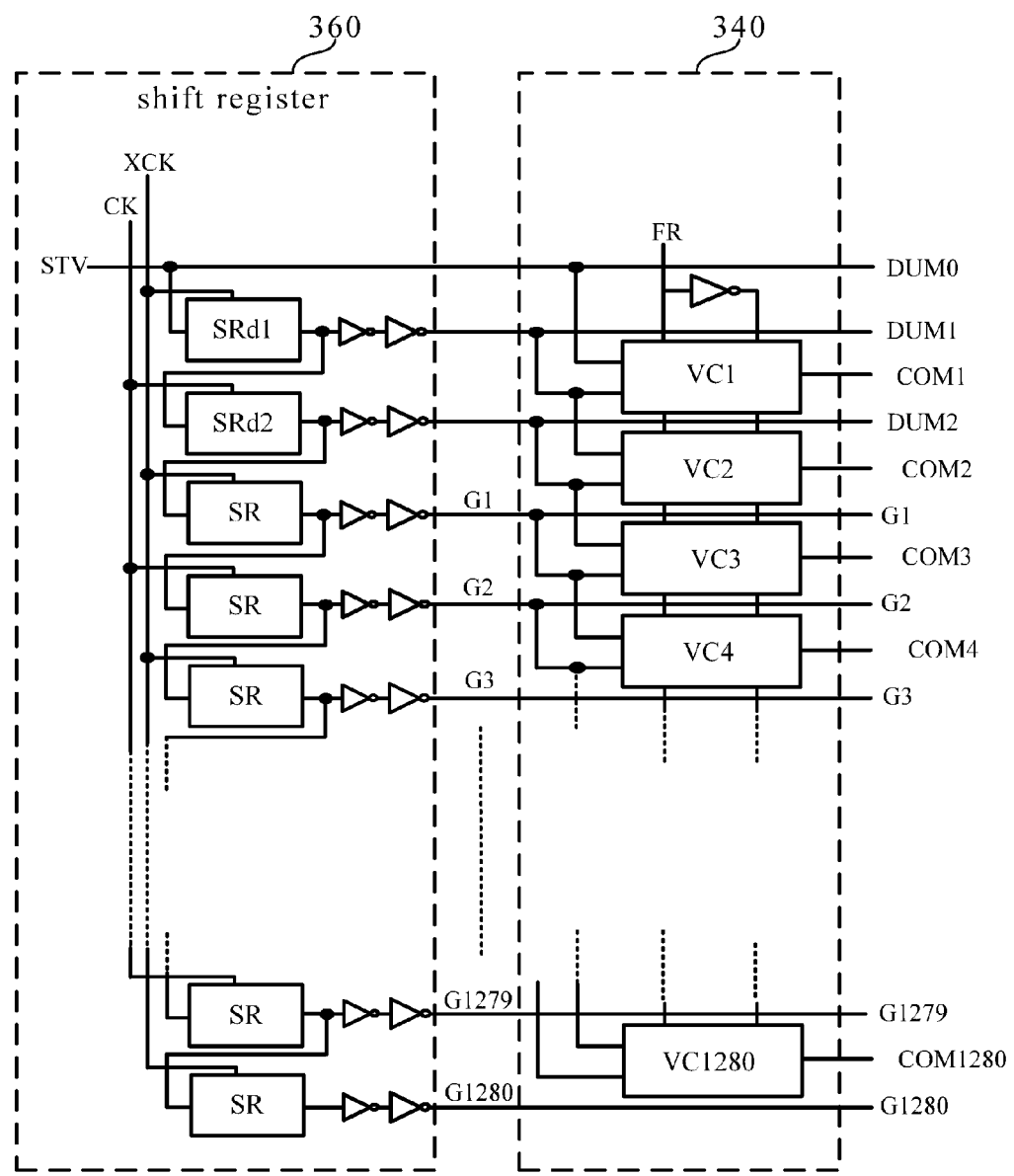
FIG. 14 illustrates the connection relationship of the embodiment in FIG. 13.
Figure 15:
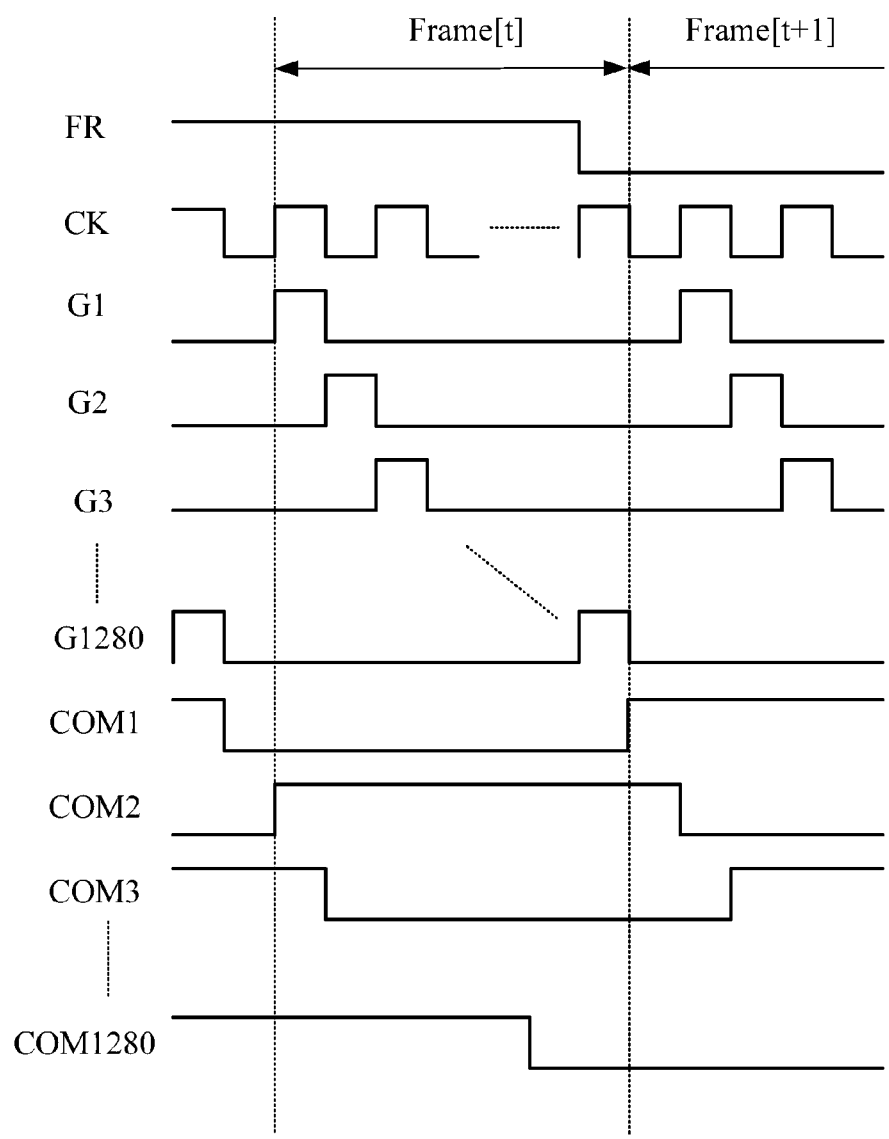
FIG. 15 is a timing diagram illustrating signal relative to the common electrode control unit according to the embodiment in FIG. 13.

Reference is also made to FIG. 13, FIG. 14 and FIG. 15. FIG. 13 illustrates the common electrode control unit VC[n] according to the general model in FIG. 12 when k is equal to 2. FIG. 14 illustrates the connection relationship of the embodiment in FIG. 13. FIG. 15 is a timing diagram illustrating signal relative to the common electrode control unit VC[n] according to the embodiment in FIG. 13. As shown in FIG. 15, the switching-over timing on the common electrode voltage is advanced because the common electrode control unit VC[n] is coupled to the scan lines G[n−2] and G[n−3].

In addition, because the embodiment shown in FIG. 13 and FIG. 14 demonstrates the case with k is equal to 2, the scan lines coupled to the common electrode control unit VC[n] are advanced to the scan lines G[n−3] and G[n−2]. As shown in FIG. 14, there are two dummy shift register units SRd1 and SRd2 placed on top of the following shift register units SR. The dummy shift register units SRd1 and SRd2 are electrically coupled to subsequent shift register units SR. The dummy shift register units SRd1 and SRd2 function as the initialization circuit before other shift register units SR for generating dummy scanning signals DUM1 and DUM2. One of the input terminals of the common electrode control unit VC3 is coupled to the dummy shift register unit SRd2 for receiving the dummy scanning signal DUM2. Two of the input terminals of the common electrode control unit VC2 are coupled to the dummy shift register units SRd1 and SRd2 respectively for receiving the dummy scanning signal DUM1 and DUM2. Two of the input terminals of the common electrode control unit VC1 are utilized for receiving the dummy scanning signal DUM0 and DUM1. The detail descriptions of the dummy circuits can be referred to aforesaid embodiments. Besides, when the value of k is set to another value, the implementation of dummy circuits can be inferred from aforesaid descriptions by a person in the art, and not to be repeated herein.

Figure 16:
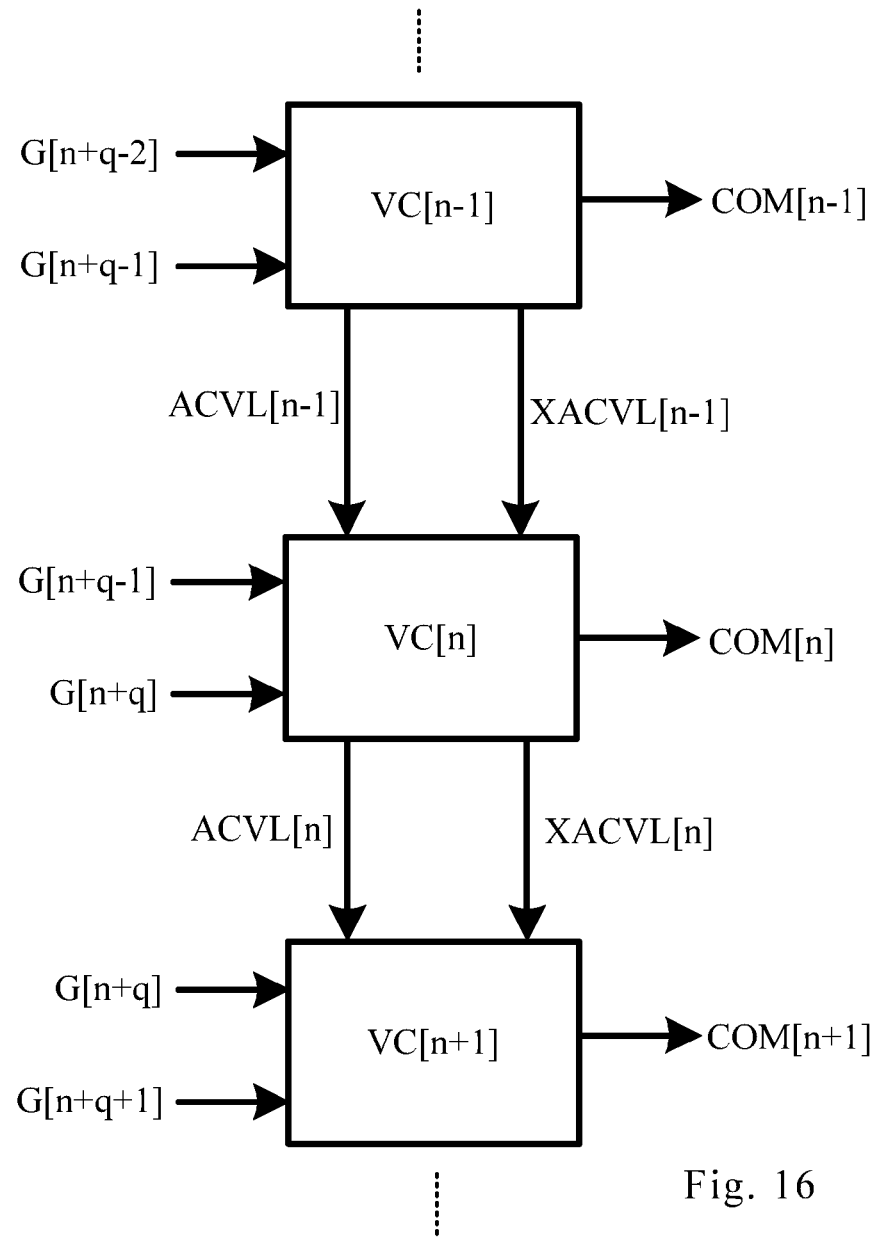
FIG. 16 is a schematic diagram illustrating the external coupling relationship of the common electrode control unit VC[n]
Figure 17:
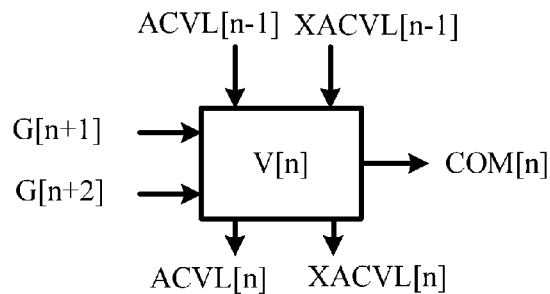
FIG. 17 illustrates the common electrode control unit according to the general model in FIG. 16 when q is equal to 2.
Figure 18:
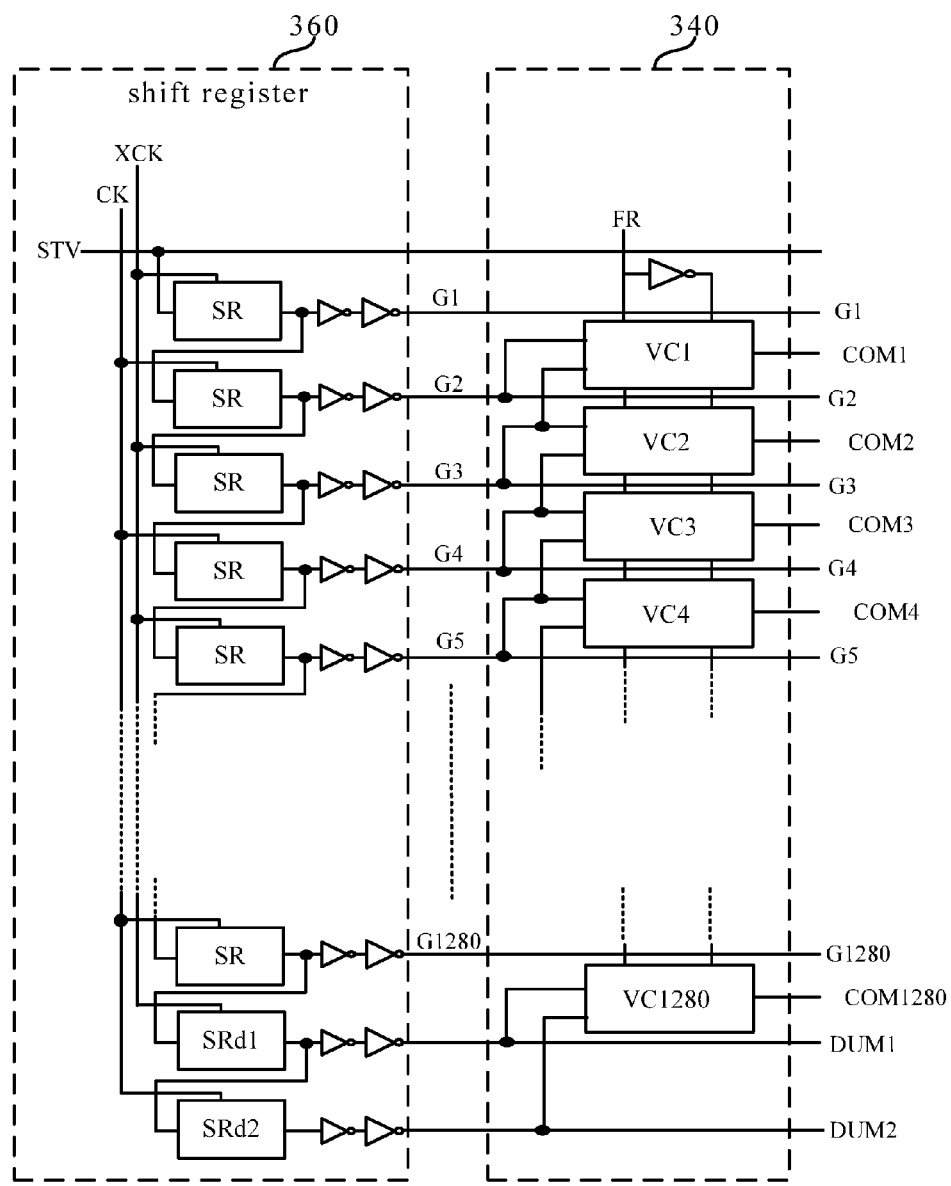
FIG. 18 illustrates the connection relationship of the embodiment in FIG. 17.
Figure 19:
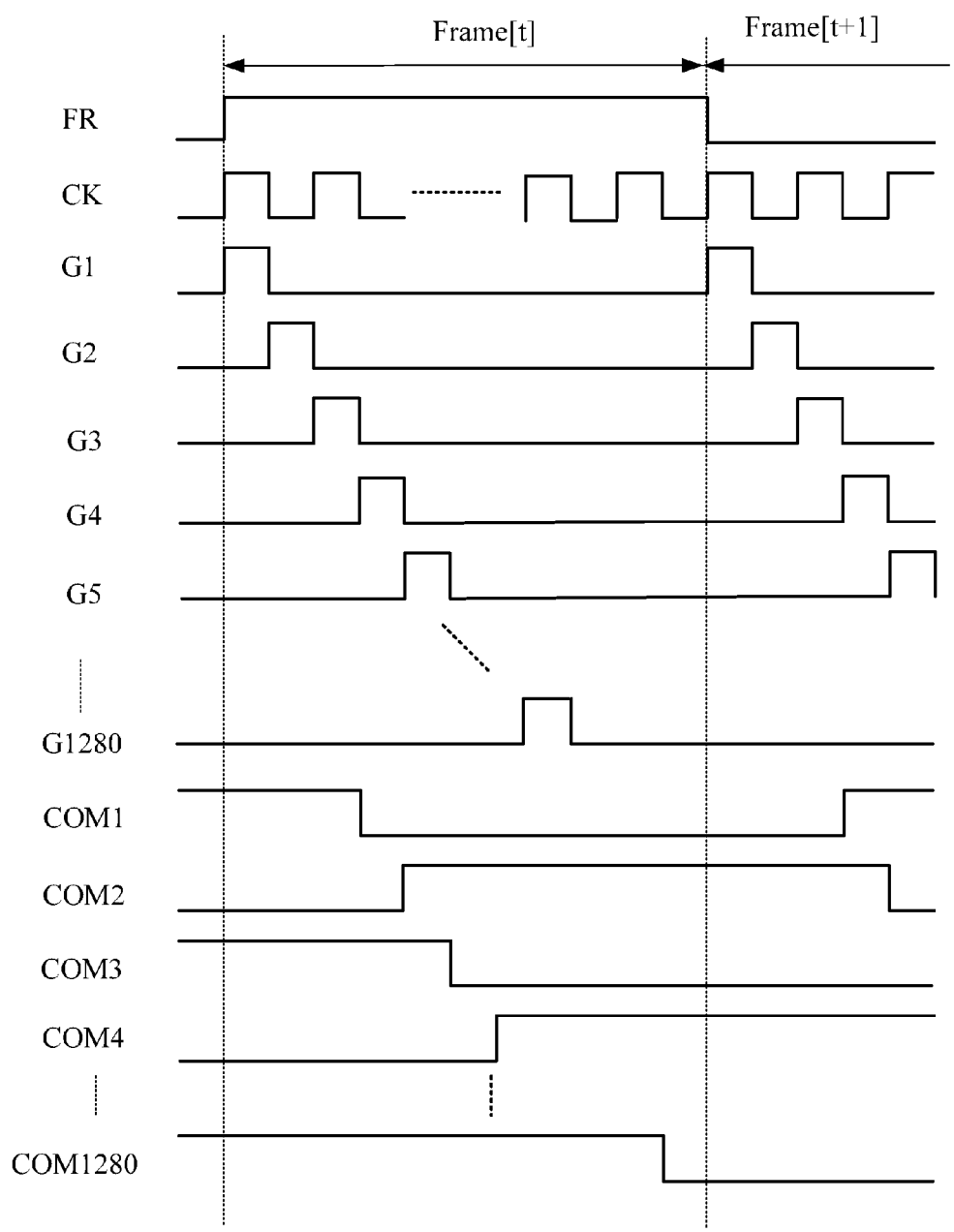
FIG. 19 is a timing diagram illustrating signal relative to the common electrode control unit according to the embodiment in FIG. 17.

In addition, reference is made to FIG. 16, which is a schematic diagram illustrating the external coupling relationship of the common electrode control unit VC[n]. FIG. 16 illustrates the common electrode control unit VC[n] according to another general model. The common electrode control unit VC[n] is coupled to two adjacent rows of scan lines in sequential stages (i.e., the scan line G[n+q−1] and the scan line G[n+q]), in which q is zero and a positive integer less than (R−n+1) and R is the amount of rows. In other words, two adjacent scan lines coupled to the common electrode control unit VC[n] can be shifted backward as well. Reference is also made to FIG. 17, FIG. 18 and FIG. 19. FIG. 17 illustrates the common electrode control unit VC[n] according to the general model in FIG. 16 when q is equal to 2. FIG. 18 illustrates the connection relationship of the embodiment in FIG. 17. FIG. 19 is a timing diagram illustrating signal relative to the common electrode control unit VC[n] according to the embodiment in FIG. 17. In the general mode shown in FIG. 16, when the value of (n+q) is a positive integer larger than the amount of rows (which is 1280 based on the vertical resolution in this case), the control terminals on the first switch and the second switch within part of the common electrode control units shall be coupled to dummy shift register units.

In addition, because the embodiment shown in FIG. 17 and FIG. 18 demonstrates the case with k is equal to 2, the scan lines coupled to the common electrode control unit VC[n] are postponed to the scan lines G[n+1] and G[n+2]. As shown in FIG. 18, there are two dummy shift register units SRd1 and SRd2 placed after the shift register units SR. The dummy shift register units SRd1 and SRd2 generate dummy scanning signals DUM1 and DUM2. Two of the input terminals of the common electrode control unit VC1280 are coupled to the dummy shift register units SRd1 and SRd2 respectively for receiving the dummy scanning signal DUM1 and DUM2. Two of the input terminals of the common electrode control unit VC1 are utilized for receiving the dummy scanning signal DUM0 and DUM1. The detail descriptions of the dummy circuits at the bottom can be referred to aforesaid embodiments with the dummy circuits on the top (corresponding to the embodiment shown in FIG. 12 to FIG. 15). Besides, when the value of q is set to another value, the implementation of dummy circuits can be inferred from aforesaid descriptions by a person in the art, and not to be repeated herein.

FIG. 19 is a timing diagram illustrating signals relative to the common electrode control unit VC[n] according to the embodiment in FIG. 17. As the embodiment shown in FIG. 19, the common electrode control unit VC[n] is coupled to the scan lines g[n+1] and G[n+2], such that the switching-over timing of the common electrode voltage is postponed.

Figure 20:
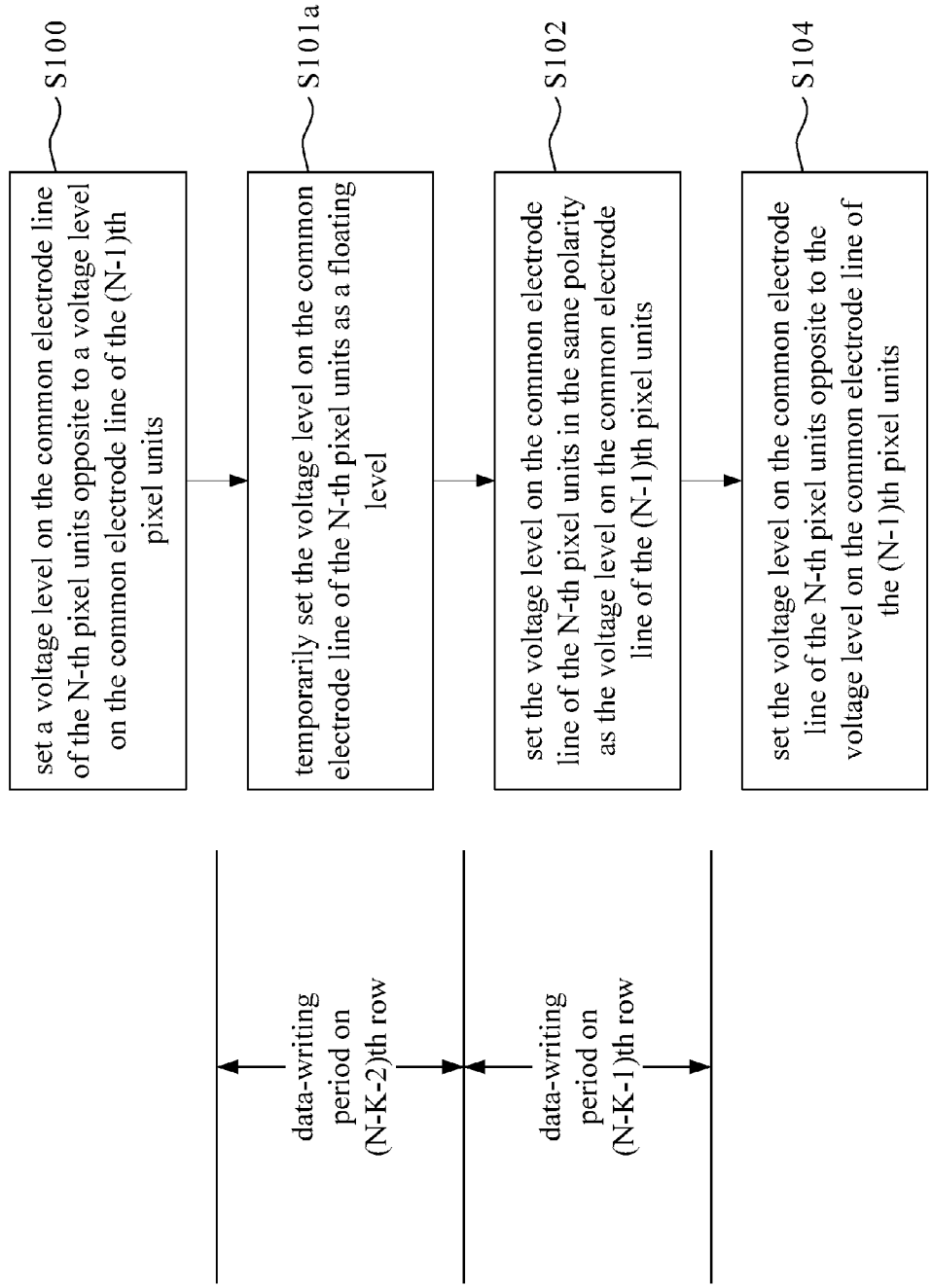
FIG. 20 is a flow chart illustrating a display driving method according to an embodiment of the invention.

Reference is made to FIG. 20, which is a flow chart illustrating a display driving method according to an embodiment of the invention. The display driving method is suitable for driving a liquid crystal display panel. The liquid crystal display panel includes a plurality of data lines on a plurality of columns, a plurality of scan lines on a plurality of rows, a plurality of common electrode lines and a plurality of pixel units on the rows. Each of the rows has a plural of pixel units. Each of the pixel units is electrically coupled to a corresponding data line and a corresponding scan line. The pixel units on the same row are electrically coupled to the same scan line. Each of the pixel units includes a storage capacitor. The capacitors of the pixel units on each row are electrically coupled one corresponding common electrode line. The internal structure of the LCD panel can be referred to the display panel 300 shown in FIG. 3 according to aforesaid embodiment, but the display driving method is not limited to the LCD panel 300 shown in FIG. 3.

The display driving method executes step S100, for setting a voltage level on the common electrode line of the N-th pixel units opposite to a voltage level on the common electrode line of the (N−1)th pixel units before a data-writing period to the pixel units on the (N−K−1)th row, wherein N is a positive integer larger than 1 (it can be referred to FIG. 7 and relative embodiments above, in which FIG. 7 illustrates the case when K=0).

Step S102 is executed for setting the voltage level on the common electrode line of the N-th pixel units in the same polarity as the voltage level on the common electrode line of the (N−1)th pixel units during the data-writing period to the pixel units on the (N−K−1)th row. Further explanations can be referred to the embodiment relative to FIG. 7.

Step S104 is executed for setting the voltage level on the common electrode line of the N-th pixel units opposite to the voltage level on the common electrode line of the (N−1)th pixel units after the data-writing period to the pixel units on the (N−Q−1)th row. Q is zero or a positive integer less than (N−2). Further explanations can be referred to the embodiment relative to FIG. 7.

In addition, between step S100 and step S102, as the described embodiment shown in FIG. 7, at the beginning of the data-writing period PB to the pixel units on the (n−1)th row (i.e., at the junction of the periods PA and PB), the scan lines G[n−1] and G[n−2] are switched simultaneously. The third switch T3 in the embodiment is disclosed to prevent the transient voltage disturbance or delay on the scan line G[n−1] from malfunctioning the first switch T1 and the second switch T2 (e.g. turning on or turning off the first switch T1 and a second switch T2 simultaneously). The display driving method in the embodiment further executes step S101a for temporarily setting the voltage level on the common electrode line of the N-th pixel units as a floating level, before the data-writing period to the pixel units on the (N−K−1)th row is initialized and during a data-writing period to the pixel units on the (N−K−2)th row. The temporary floating level on the common electrode line can be realized by the third switch shown in FIG. 6, and the detail descriptions can be referred to FIG. 6, FIG. 7 and relative embodiments. However, there are still short floating periods (such as the period FL shown in FIG. 7) of voltage levels existed on the common electrode lines in the display driving method in FIG. 20.

Figure 21:
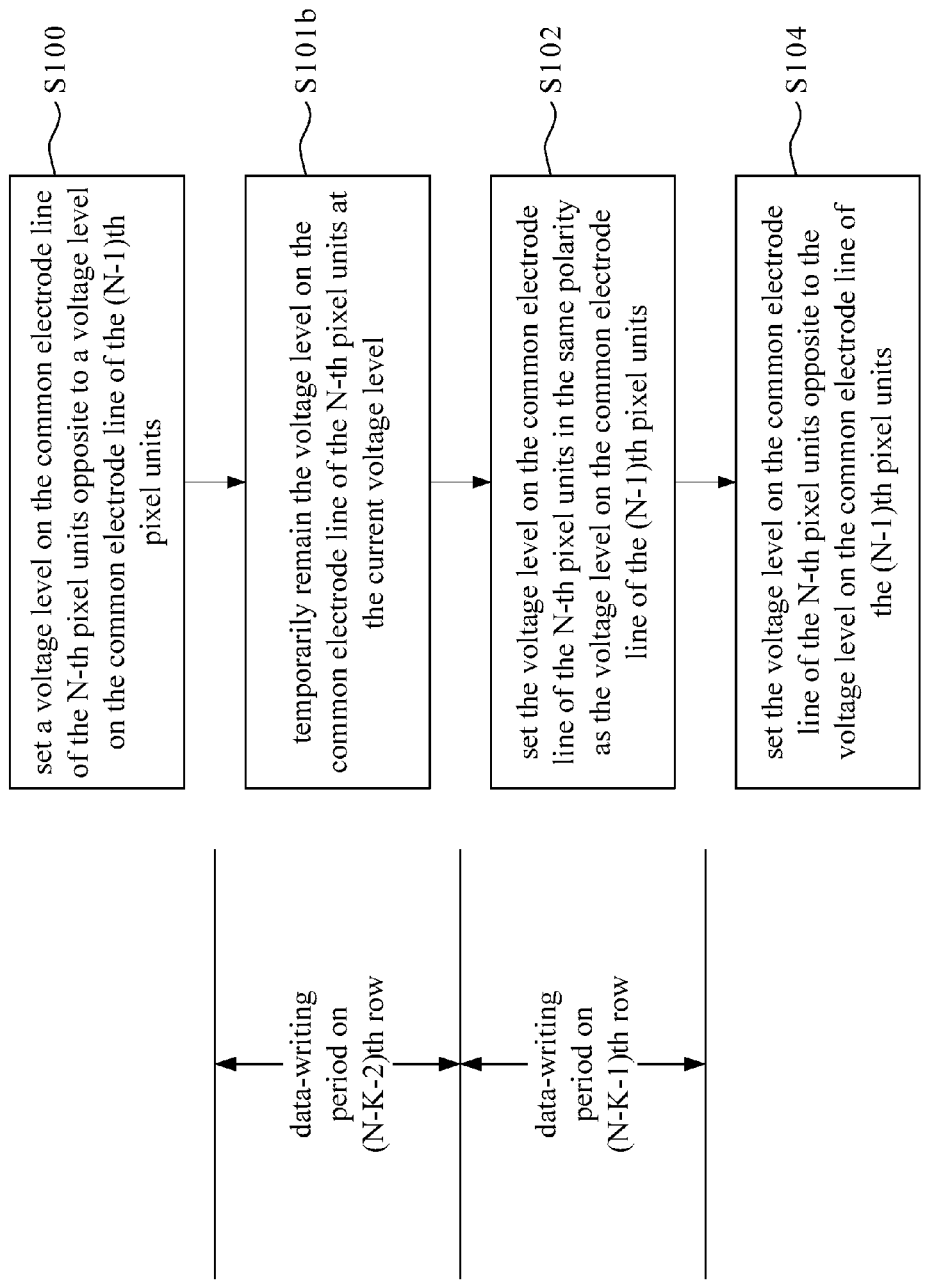
FIG. 21 is a flow chart illustrating a display driving method according to an embodiment of the invention.

Reference is made to FIG. 21, which is a flow chart illustrating a display driving method according to an embodiment of the invention. Compared to FIG. 20, the display driving method according to the embodiment in FIG. 21 executes step S101b between steps S100 and S102, for temporarily remaining the voltage level on the common electrode line of the N-th pixel units at the current voltage level before the data-writing period to the pixel units on the (N−K−1)th row is initialized, and keeping the voltage level during a data-writing period to the pixel units on the (N−K−2)th row. The temporary floating level on the common electrode line can be realized by the third switch and the fourth switch shown in FIG. 10, and the detail descriptions can be referred to FIG. 10, FIG. 11 and relative embodiments.

Reference is made to FIG. 22, which is a flow chart illustrating a display driving method according to an embodiment of the invention. Firstly, the display driving method executes step S200 for setting a voltage level on the common electrode line of the N-th pixel units opposite to a voltage level on the common electrode line of the (N−1)th pixel units, before a data-writing period to the pixel units on the (N+Q−1)th row. N is a positive integer larger than 1.

Afterward, step S202 is executed for setting the voltage level on the common electrode line of the N-th pixel units in the same polarity as the voltage level on the common electrode line of the (N−1)th pixel units during the data-writing period to the pixel units on the (N+Q−1)th row.

Afterward, step S204 is executed for setting the voltage level on the common electrode line of the N-th pixel units opposite to the voltage level on the common electrode line of the (N−1)th pixel units after the data-writing period to the pixel units on the (N+Q−1)th row. Q is zero or a positive integer larger than zero and less than (R−N+1), and R is the amount of rows.

The display driving method shown in FIG. 22 corresponds to the display driving method shown in FIG. 20 and FIG. 21. The difference is that, the display driving method in FIG. 20 and FIG. 21 shifts the switching-over timing of the common electrode voltage forward, and the display driving method in FIG. 22 shifts the switching-over timing of the common electrode voltage backward. The relationship between two methods is described in details within aforesaid embodiments and figures (i.e., FIG. 5 to FIG. 15 are relative to the FIG. 20 to FIG. 20, and FIG. 16 to FIG. 19 are relative to FIG. 22), and not to be repeated herein. Similarly, an extra step can be inserted between steps S200 and S202 of the embodiment shown in FIG. 22, for temporarily setting the voltage level on the common electrode line of the N-th pixel units as a floating level (corresponding to FIG. 20) or remaining the voltage level still (corresponding to FIG. 21).

According to aforesaid embodiments, the invention provides a liquid crystal display (LCD) panel and a display driving method. The LCD panel in this disclosure includes a simple-constructed common electrode control unit. In order to prevent pixel unit on one row from being disturbed by pixel units on other rows during the non-active period, the common electrode control unit can reduce the duration in which the common electrode lines are floating, or the common electrode control unit can prevent the common electrode line from floating.

As is understood by a person skilled in the art, the foregoing embodiments of the present disclosure are illustrative of the present disclosure rather than limiting of the present disclosure. It is intended to cover various modifications and similar arrangements included within the spirit and scope of the appended claims, the scope of which should be accorded with the broadest interpretation so as to encompass all such modifications and similar structures.

What is claimed is:

1. A liquid crystal display panel, comprising:
a plurality of data lines on a plurality of columns;
a plurality of scan lines on a plurality of rows;
a plurality of pixel units on the rows, each of the rows having a plurality of pixel units, each of the pixel units being electrically coupled to a corresponding data line and a corresponding scan line, the pixel units on the same row being electrically coupled to the same scan line, each of the pixel units comprising a storage capacitor;
a first and a second common electrode lines, the first and the second common electrode lines being coupled to ends of the storage capacitors within the pixel units on two rows from the rows respectively;
a first and a second common electrode control units, the first and the second common electrode control units being coupled to the pixel units on these two rows via the first and the second common electrode lines, for generating a first output signal and an second output signal opposite to the first output signal and controlling voltage levels on the first and the second common electrode lines, each of the first and the second common electrode control units comprising a selection unit and an output unit, the output units of the first and the second common electrode control unit being electrically coupled to the first and the second common electrode lines respectively, wherein
the selection unit of the first common electrode control unit is configured to receive a first input signal and a second input signal opposite to the first input signal and selectively outputs the first input signal or the second input signal;
the output unit of the first common electrode control unit, electrically coupled to the selection unit of the first electrode control unit, is configured to output the first output signal and the second output signal of the first common electrode control unit;
the selection unit of the second common electrode control unit is configured to receive the first output signal from the first common electrode control unit and the second output signal from the first common electrode control unit, and selectively outputs the first output signal from the first common electrode control unit or the second output signal from the first common electrode control unit; and
the output unit of the second common electrode control unit, electrically coupled to the selection unit of the second electrode control unit, is configured to output the first output signal and the second output signal of the second common electrode control unit.

2. The liquid crystal display panel as claimed in claim 1, wherein each selection unit of the first and the second common electrode control units comprises a first switch and a second switch, conductive states on the first switch and the second switch is mutually-exclusive, wherein
an input terminal on the first switch of the first common electrode control unit is configured for receiving the first input signal;
an input terminal on the second switch of the first common electrode control unit is configured for receiving the second input signal, control terminals on the first switch and the second switch are electrically coupled to one of the scan lines;
an input terminal on the first switch of the second common electrode control unit is configured for receiving the first output signal from the first common electrode control unit;
an input terminal on the second switch of the second common electrode control unit is configured for receiving the second output signal from the first common electrode control unit, control terminals on the first switch and the second switch are electrically coupled to one of the scan lines;
wherein each output unit of the first and the second common electrode control units comprises a third switch and a first inverter, each third switch has an input terminal, an output terminal and a control terminal, each first inverter has an input terminal and an output terminal, wherein
the input terminal on the third switch of the first common electrode control unit is electrically coupled to the output terminals on the first switch and the second switch of the first common electrode control unit, the control terminal on the third switch of the first common electrode control unit is electrically coupled to one of the scan lines;
the input terminal on the first inverter of the first common electrode control unit is electrically coupled to the output terminal on the third switch of the first common electrode control unit, and the input terminal on the first inverter of the first common electrode control unit provides the first output signal of the first common electrode control unit, the output terminal on the first inverter of the first common electrode control unit is electrically coupled to the first common electrode line, and the output terminal on the first inverter of the first common electrode control unit provides the second output signal of the first common electrode control unit;
the input terminal on the third switch of the second common electrode control unit is electrically coupled to the output terminals of the first switch and the second switch of the second common electrode control unit, the control terminal on the third switch of the second common electrode control unit is electrically coupled to one of the scan lines;
the input terminal on the first inverter of the second common electrode control unit is electrically coupled to the output terminal on the third switch of the second common electrode control unit, and the input terminal on the first inverter of the second common electrode control unit provides the first output signal of the second common electrode control unit, the output terminal on the first inverter of the second common electrode control unit is electrically coupled to the second common electrode line, and the output terminal on the first inverter of the second common electrode control unit provides the second output signal of the second common electrode control unit.

3. The liquid crystal display panel as claimed in claim 2, wherein each common electrode control unit further comprises a level-adjustment circuit, which is electrically coupled between the output terminal of the third switch of the common electrode control unit and the common electrode line electrically coupled with the common electrode control unit, the level-adjustment circuit is configured for shifting a voltage range of the first output signal of the common electrode control unit.

4. The liquid crystal display panel as claimed in claim 2, wherein the first common electrode control unit is electrically coupled to the pixel units on the (N−1)th row, the second common electrode control unit is electrically coupled to the pixel units on the N-th row, wherein N is a positive integer larger than 2;

the control terminals on the first switch and the second switch of the first common electrode control unit are electrically coupled to the scan line corresponding to the pixel units on the (N−K−1)th row, the control terminal on the third switch of the first common electrode control unit is electrically coupled to the scan line corresponding to the pixel units on the (N−K−2)th row;

the control terminals on the first switch and the second switch of the second common electrode control unit are electrically coupled to the scan line corresponding to the pixel units on the (N−K)th row, the control terminal on the third switch of the common electrode control unit corresponding to the pixel units on the N-th row is electrically coupled to the scan line corresponding to the pixel units on the (N−K−1)th row; and K is zero or a positive integer less than (N−2).

5. The liquid crystal display panel as claimed in claim 2, wherein the first common electrode control unit is electrically coupled to the pixel units on the (N−1)th row, the second common electrode control unit is electrically coupled to the pixel units on the N-th row, wherein N is a positive integer larger than 1;

the control terminals on the first switch and the second switch of the first common electrode control unit are electrically coupled to the scan line corresponding to the pixel units on the (N+Q−1)th row, the control terminal on the third switch of the first common electrode control unit is electrically coupled to the scan line corresponding to the pixel units on the (N+Q−2)th row;

the control terminals on the first switch and the second switch of the second common electrode control unit are electrically coupled to the scan line corresponding to the pixel units on the (N+Q)th row, the control terminal on the third switch of the common electrode control unit corresponding to the pixel units on the N-th row is electrically coupled to the scan line corresponding to the pixel units on the (N+Q−1)th row; and Q is zero or a positive integer larger than zero and less than (R−N+1), and R is the amount of rows.

6. The liquid crystal display panel as claimed in claim 1, wherein each selection unit of the first and the second common electrode control units comprises a first switch and a second switch, which are mutually-exclusive conducted, wherein an input terminal on the first switch of the first common electrode control unit is configured for receiving the first input signal;

an input terminal on the second switch of the first common electrode control unit is configured for receiving the second input signal, control terminals on the first switch and the second switch are electrically coupled to one of the scan lines;

an input terminal on the first switch of the second common electrode control unit is configured for receiving the first output signal from the first common electrode control unit;

an input terminal on the second switch of the second common electrode control unit is configured for receiving the second output signal from the first common electrode control unit, and control terminals on the first switch and the second switch are electrically coupled to one of the scan lines;

wherein each output unit of the first and the second common electrode control units comprises a third switch, a first inverter and a second inverter, each third switch has an input terminal, an output terminal and a control terminal, each of the first inverter and the second inverter has an input terminal and an output terminal, wherein the input terminal on the third switch of the first common electrode control unit is electrically coupled to the output terminals on the first switch and the second switch of the first common electrode control unit, the control terminal on the third switch of the first common electrode control unit is electrically coupled to one of the scan lines;

the second inverter of the first common electrode control unit is connected in series between the output terminal on the third switch of the first common electrode control unit and the input terminal on the first inverter of the first common electrode control unit, a node level between the first inverter and the second inverter of the first common electrode control unit provides the second output signal of the first common electrode control unit, the output terminal on the first inverter of the first common electrode control unit is electrically coupled to the first common electrode line, and the output terminal on the first inverter of the first common electrode control unit provides the first output signal of the first common electrode control unit;

the input terminal on the third switch of the second common electrode control unit is electrically coupled to the output terminals on the first switch and the second switch of the second common electrode control unit, the control terminal on the third switch of the second common electrode control unit is electrically coupled to one of the scan lines;

the second inverter of the second common electrode control unit is connected in series between the output terminal on the third switch of the second common electrode control unit and the input terminal on the first inverter of the second common electrode control unit, a node level between the first inverter and the second inverter of the second common electrode control unit provides the second output signal of the second common electrode control unit, the output terminal on the first inverter of the first common electrode control unit is electrically coupled to the second common electrode line, and the output terminal on the first inverter of the second common electrode control unit provides the first output signal of the second common electrode control unit.

7. The liquid crystal display panel as claimed in claim 6, wherein each common electrode control unit further comprises a fourth switch, the fourth switch comprises an input terminal, an output terminal and a control terminal, the input terminal on the fourth switch is electrically coupled to the output terminal on the first inverter, the output terminal on the fourth switch is electrically coupled to the input terminal on the second inverter, the control terminal of the fourth switch and the control terminal of the third switch are electrically coupled to the same scan line, conductive states on the third switch and the fourth switch is mutually-exclusive.

8. The liquid crystal display panel as claimed in claim 6, wherein each common electrode control unit further comprises a level-adjustment circuit, which is electrically coupled between the output terminal of the third switch of the common electrode control unit and the common electrode line electrically coupled with the common electrode control unit, the level-adjustment circuit is configured for shifting a voltage range of the first output signal of the common electrode control unit.

9. The liquid crystal display panel as claimed in claim 6, wherein the first common electrode control unit is electrically coupled to the pixel units on the (N−1)th row, the second common electrode control unit is electrically coupled to the pixel units on the N-th row, wherein N is a positive integer larger than 2;

the control terminals on the first switch and the second switch of the first common electrode control unit are electrically coupled to the scan line corresponding to the pixel units on the (N−K−1)th row, the control terminal on the third switch of the first common electrode control unit is electrically coupled to the scan line corresponding to the pixel units on the (N−K−2)th row;

the control terminals on the first switch and the second switch of the second common electrode control unit are electrically coupled to the scan line corresponding to the pixel units on the (N−K)th row, the control terminal on the third switch of the common electrode control unit corresponding to the pixel units on the N-th row is electrically coupled to the scan line corresponding to the pixel units on the (N−K−1)th row; and K is zero or a positive integer less than (N−2).

10. The liquid crystal display panel as claimed in claim 6, wherein the first common electrode control unit is electrically coupled to the pixel units on the (N−1)th row, the second common electrode control unit is electrically coupled to the pixel units on the N-th row, wherein N is a positive integer larger than 1;

the control terminals on the first switch and the second switch of the first common electrode control unit are electrically coupled to the scan line corresponding to the pixel units on the (N+Q−1)th row, the control terminal on the third switch of the first common electrode control unit is electrically coupled to the scan line corresponding to the pixel units on the (N+Q−2)th row;

the control terminals on the first switch and the second switch of the second common electrode control unit are electrically coupled to the scan line corresponding to the pixel units on the (N+Q)th row, the control terminal on the third switch of the common electrode control unit corresponding to the pixel units on the N-th row is electrically coupled to the scan line corresponding to the pixel units on the (N+Q−1)th row; and Q is zero or a positive integer larger than zero and less than (R−N+1), and R is the amount of rows.

11. The liquid crystal display panel as claimed in claim 1, further comprising a shift register, the shift register comprising:

a plurality of shift register units configured for providing a sequential scanning signal to the scan lines.

12. A display driving method, suitable for driving a liquid crystal display panel, the liquid crystal display panel comprising a plurality of data lines on a plurality of columns, a plurality of scan lines on a plurality of rows, a plurality of common electrode lines and a plurality of pixel units on the rows, each of the rows having a plural of pixel units, each of the pixel units being electrically coupled to a corresponding data line and a corresponding scan line, the pixel units on the same row being electrically coupled to the same scan line, each of the pixel units comprising a storage capacitor, the capacitors of the pixel units on each row being electrically coupled one corresponding common electrode line, the driving method comprising:

before a data-writing period to the pixel units on the (N−K−1)th row, setting a voltage level on the common electrode line of the N-th pixel units opposite to a voltage level on the common electrode line of the (N−1)th pixel units, wherein N is a positive integer larger than 1;

during the data-writing period to the pixel units on the (N−K−1)th row, setting the voltage level on the common electrode line of the N-th pixel units in the same polarity as the voltage level on the common electrode line of the (N−1)th pixel units; and after the data-writing period to the pixel units on the (N−K−1)th row, setting the voltage level on the common electrode line of the N-th pixel units opposite to the voltage level on the common electrode line of the (N−1)th pixel units, wherein K is zero or a positive integer less than (N−2).

13. The display driving method as claimed in claim 12, further comprising:

before the data-writing period to the pixel units on the (N−K−1)th row is initialized and during a data-writing period to the pixel units on the (N−K−2)th row, setting the voltage level on the common electrode line of the N-th pixel units as a floating level.

14. The display driving method as claimed in claim 12, further comprising:

before the data-writing period to the pixel units on the (N−K−1)th row is initialized and during a data-writing period to the pixel units on the (N−K−2)th row, remaining the voltage level on the common electrode line of the N-th pixel units.

15. A display driving method, suitable for driving a liquid crystal display panel, the liquid crystal display panel comprising a plurality of data lines on a plurality of columns, a plurality of scan lines on a plurality of rows, a plurality of common electrode lines and a plurality of pixel units on the rows, each of the rows having a plural of pixel units, each of the pixel units being electrically coupled to a corresponding data line and a corresponding scan line, the pixel units on the same row being electrically coupled to the same scan line, each of the pixel units comprising a storage capacitor, the capacitors of the pixel units on each row being electrically coupled one corresponding common electrode line, the driving method comprising:

before a data-writing period to the pixel units on the (N+Q−1)th row, setting a voltage level on the common electrode line of the N-th pixel units opposite to a voltage level on the common electrode line of the (N−1)th pixel units, wherein N is a positive integer larger than 1;

during the data-writing period to the pixel units on the (N+Q−1)th row, setting the voltage level on the common electrode line of the N-th pixel units in the same polarity as the voltage level on the common electrode line of the (N−1)th pixel units; and after the data-writing period to the pixel units on the (N+Q−1)th row, setting the voltage level on the common electrode line of the N-th pixel units opposite to the voltage level on the common electrode line of the (N−1)th pixel units, wherein Q is zero or a positive integer larger than zero and less than (the R−N+1), and R is the amount of rows.

16. The display driving method as claimed in claim 15, further comprising:

before the data-writing period to the pixel units on the (N+Q−1)th row is initialized and during a data-writing period to the pixel units on the (N+Q−2)th row, setting the voltage level on the common electrode line of the N-th pixel units as a floating level.

17. The display driving method as claimed in claim 15, further comprising:

before the data-writing period to the pixel units on the (N+Q−1)th row is initialized and during a data-writing period to the pixel units on the (N+Q−2)th row, remaining the voltage level on the common electrode line of the N-th pixel units.

* * * * *